United States Patent
Matsubara

(10) Patent No.: US 10,306,416 B2
(45) Date of Patent: May 28, 2019

(54) ELECTRONIC CONVERTER, REVERSE ELECTRONIC CONVERTER, PROGRAM AND INFORMATION COMMUNICATION SYSTEM

(71) Applicant: MRS HOLDINGS CO.,LTD., Tokyo (JP)

(72) Inventor: Takashi Matsubara, Tokyo (JP)

(73) Assignee: MRS HOLDINGS CO., LTD. (JP)

( * ) Notice: Subject to any disclaimer, the term of this patent is extended or adjusted under 35 U.S.C. 154(b) by 53 days.

(21) Appl. No.: 15/325,412

(22) PCT Filed: Jul. 10, 2015

(86) PCT No.: PCT/JP2015/069968
§ 371 (c)(1),
(2) Date: Jan. 10, 2017

(87) PCT Pub. No.: WO2016/006703
PCT Pub. Date: Jan. 14, 2016

(65) Prior Publication Data
US 2017/0188198 A1     Jun. 29, 2017

(30) Foreign Application Priority Data

Jul. 11, 2014  (JP) ................................. 2014-142850
Nov. 20, 2014  (JP) ................................. 2014-235419

(51) Int. Cl.
*H04W 4/02*     (2018.01)
*H04B 11/00*    (2006.01)
(Continued)

(52) U.S. Cl.
CPC ............. *H04W 4/027* (2013.01); *G01D 5/12* (2013.01); *G06Q 20/10* (2013.01); *G06Q 20/20* (2013.01);
(Continued)

(58) Field of Classification Search
None
See application file for complete search history.

(56) References Cited

U.S. PATENT DOCUMENTS

| | | | | |
|---|---|---|---|---|
| 2002/0102963 | A1* | 8/2002 | Heinonen | G06Q 20/04 455/406 |
| 2012/0271725 | A1 | 10/2012 | Cheng | |
| 2013/0010979 | A1* | 1/2013 | Takara | G10L 19/093 381/77 |
| 2014/0176317 | A1 | 6/2014 | Sawa et al. | |

FOREIGN PATENT DOCUMENTS

| | | |
|---|---|---|
| JP | 2005-48824 A | 6/2005 |
| JP | 2005-293602 A | 10/2005 |

(Continued)

*Primary Examiner* — Adolf Dsouza
(74) *Attorney, Agent, or Firm* — Harness, Dickey & Pierce, P.L.C.

(57) ABSTRACT

An electronic converter including: an information receiver configured to receive transaction information from outside through a network; a memory that is configured to store computer-readable instructions, a conversion rule, and a reverse conversion rule; an error detector that is configured to detect a detection error, a reverse-conversion error, and an output error; and a processor configured to execute the computer-readable instructions so as to: convert the transaction information into the vibration generation signal according to the conversion rule; generate vibration corresponding to the vibration generation signal; reverse-convert the vibration detection signal into the reverse-converted transaction information according to the reverse conversion rule; output the reverse-converted transaction information; and output code display promotion transaction information when the processor detects at least one of the detection error, the reverse-conversion error, or the output error. The code display promotion transaction information is alternate information of the reverse-converted transaction information.

42 Claims, 20 Drawing Sheets

(51) Int. Cl.
*H04M 1/00* (2006.01)
*G01D 5/12* (2006.01)
*G06Q 20/10* (2012.01)
*G06Q 20/20* (2012.01)
*G06Q 20/40* (2012.01)
*H04M 1/725* (2006.01)
*H04R 1/28* (2006.01)
*H04R 3/12* (2006.01)
*H04R 25/00* (2006.01)

(52) U.S. Cl.
CPC ....... *G06Q 20/40145* (2013.01); *H04B 11/00* (2013.01); *H04M 1/00* (2013.01); *H04M 1/72522* (2013.01); *H04R 1/2807* (2013.01); *H04R 3/12* (2013.01); *H04R 25/606* (2013.01)

(56) References Cited

FOREIGN PATENT DOCUMENTS

| | | |
|---|---|---|
| JP | 2008-269186 A | 11/2008 |
| JP | 2010-166129 A | 7/2010 |
| JP | 2011-128811 A | 6/2011 |
| JP | 2012-124606 A | 6/2012 |
| JP | 2012-205294 A | 10/2012 |
| JP | 2013-141054 A | 7/2013 |
| JP | 2014-123789 A | 7/2014 |
| JP | 2016-028313 A | 2/2016 |
| WO | WO-2011-118018 A1 | 9/2011 |

* cited by examiner

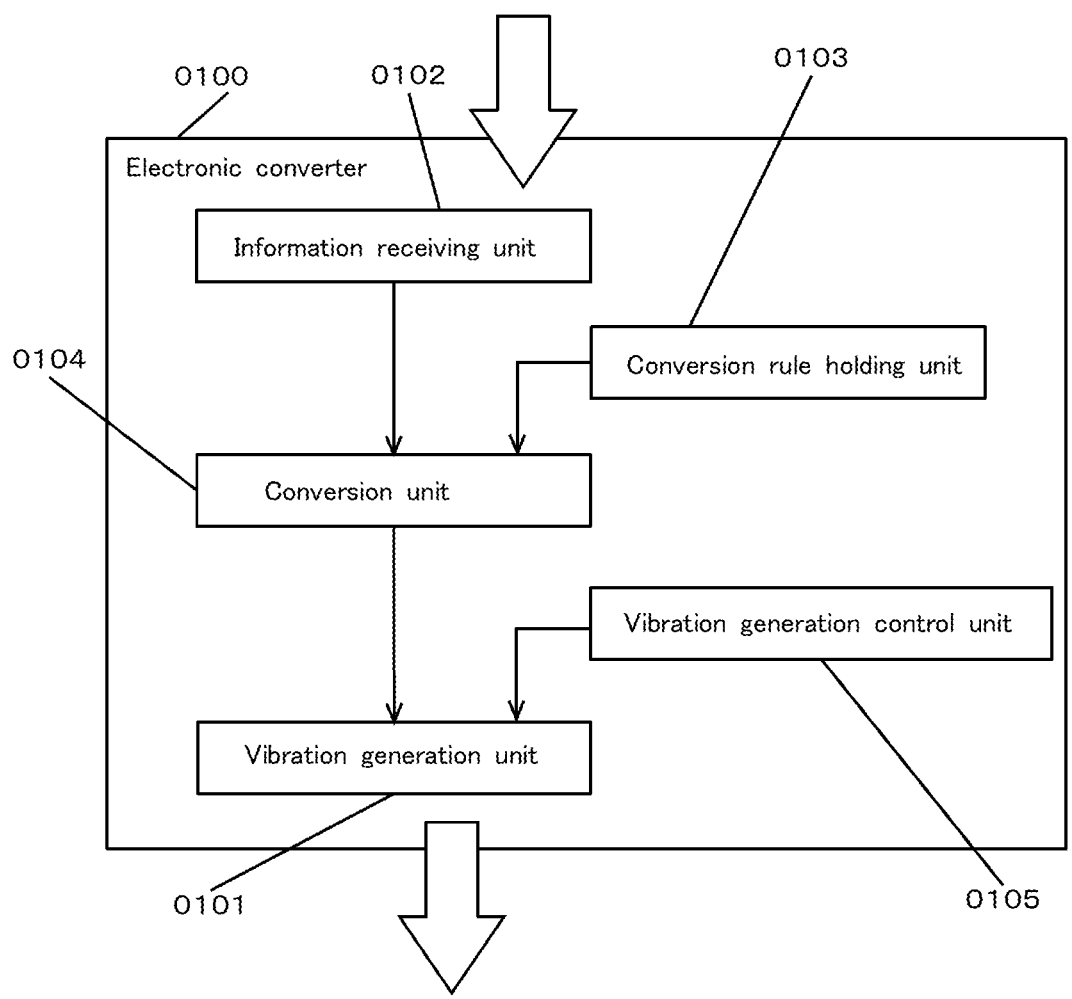

| Numerical value | Vibration generation duration (s) | Vibration frequency (per second) | Status | Vibration generation duration (s) | Vibration frequency (per second) |
|---|---|---|---|---|---|
| 0 | 0.1 | 16 | START | 0.55 | 88 |
| 1 | 0.2 | 32 | END | 0.25 | 40 |
| 2 | 0.3 | 48 | SWITCH | (0.15) | 0 |
| 3 | 0.4 | 64 | | | |
| 4 | 0.5 | 80 | | | |
| 5 | 0.6 | 96 | | | |
| 6 | 0.7 | 112 | | | |
| 7 | 0.8 | 128 | | | |
| 8 | 0.9 | 144 | | | |
| 9 | 1.0 | 160 | | | |

※Vibration frequency is 9,600 rpm

※Numerical value in "SWITCH" column represents non-vibration generation duration Case where transaction information is "4901350221233"

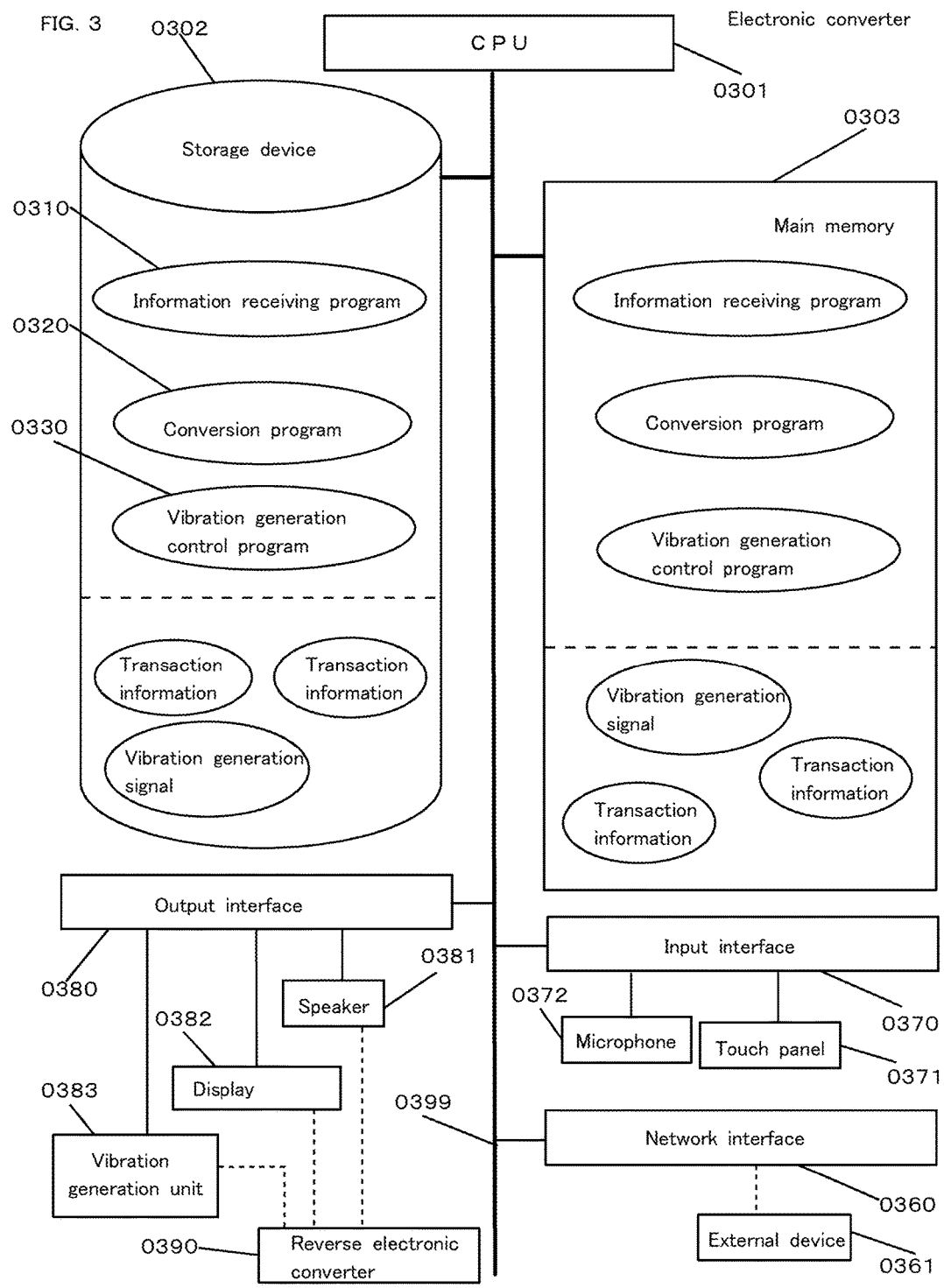

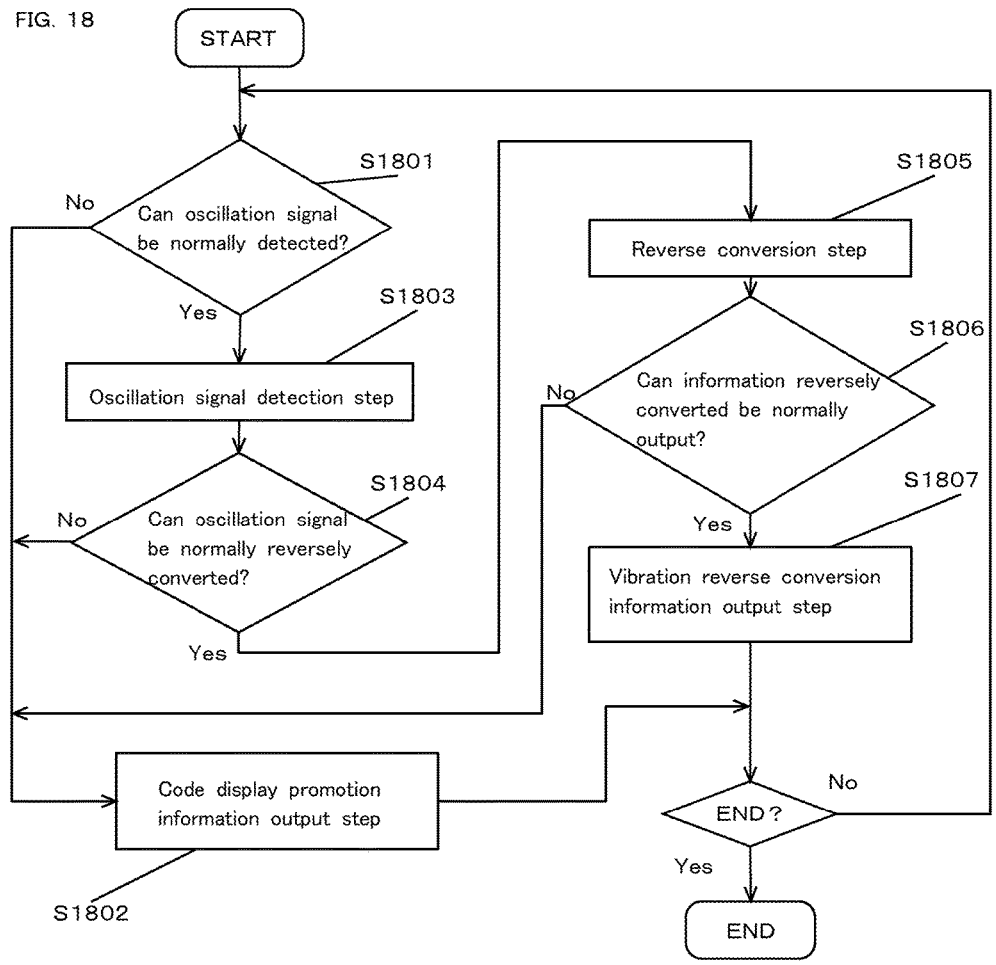

ELECTRONIC CONVERTER, REVERSE ELECTRONIC CONVERTER, PROGRAM AND INFORMATION COMMUNICATION SYSTEM

CROSS-REFERENCE TO RELATED APPLICATIONS

This application is a U.S. National Phase Application under 35 U.S.C. 371 of International Application No. PCT/JP2015/069968, filed on Jul. 10, 2015. This application claims priority to Japanese Patent Application No. 2014-142850, filed Jul. 11, 2014 and Japanese Patent Application No. 2014-235419, filed on Nov. 20, 2014. The entire disclosures of the above applications are incorporated herein by reference.

TECHNICAL FIELD

The present invention relates to an information communication system for transmitting and receiving transaction information by generating vibration or an ultrasonic wave. More specifically, the present invention relates to an electronic converter for generating vibration or an ultrasonic wave, a reverse electronic converter for acquiring transaction information based on the detected vibration or ultrasonic wave, and a program for operating the electronic converters.

BACKGROUND ART

Proposals have been made on various techniques to be utilized in a personal digital assistant such as a cellular phone and a smartphone for a commercial transaction. As one of the above techniques, such a system is widely known in which a business operator transmits, from a server administered by the business operator per se to the personal digital assistant administered by a consumer, a benefit (coupon) relating to specific merchandise purchase or transmit settlement transaction information for performing settlement of a merchandise price, or the like. The consumer displays the transmitted benefit or settlement transaction information on a display of the personal digital assistant, or the like.

In addition, a means for providing information convenient for the transaction is not limited to displayed output on the display. For example, a configuration according to which the transaction information is transmitted and received by using a telecommunication means such as Bluetooth (registered trademark), Wi-Fi (registered trademark) and RFID is conceivable.

Moreover, JP 2013-141054 A discloses an art in which an ultrasonic wave is output inside a specific section to provide a personal digital assistant existing inside the section with transaction information contributing to a transaction such as a point return.

However, with regard to displayed output on a display, a third party photographs the display screen, thereby easily duplicating information. Moreover, in the case of a configuration of communicating transaction information by using various telecommunication means or the ultrasonic wave described in JP 2013-141054 A, a possibility of interference by another communication, interception from a third party or a codec analysis cannot be excluded.

SUMMARY

In order to solve the problems as described above, the present invention proposes an electronic converter having: a vibration generation unit for generating vibration based on a vibration generation signal; an information receiving unit for receiving transaction information from outside through a network; a conversion rule holding unit for holding a conversion rule being a rule for converting the transaction information into the vibration generation signal; a conversion unit for converting the transaction information received by the information receiving unit from outside through the network into the vibration generation signal based on the conversion rule held in the conversion holding unit; and a vibration generation control unit for controlling the vibration generation unit based on the vibration generation signal converted in the conversion unit.

Moreover, the present invention also proposes a reverse electronic converter having: an oscillation signal detection unit for detecting the vibration generated in the electronic converter as an oscillation signal; a reverse conversion rule holding unit for holding a reverse conversion rule being a rule for converting the detected oscillation signal into transaction information; a reverse conversion unit for converting the oscillation signal detected in the oscillation signal detection unit into the transaction information according to the reverse conversion rule held in the reverse conversion rule holding unit; and a vibration reverse conversion information output unit for outputting the transaction information reversely converted in the reverse conversion unit. The present invention simultaneously proposes an information communication system for transmitting and receiving information between the electronic converter and the reverse electronic converter.

In addition, the present invention also proposes an electronic converter and a reverse electronic converter that realize such a configuration by an ultrasonic wave in place of the vibration (hereinafter, unless otherwise stated in the whole of the present description, all of the terms "vibration" can be read as "ultrasonic wave.")

Advantageous Effects of Invention

According to the present invention in which the configuration as described above is mainly adopted, a transmission source of information can transmit transaction information safely and smoothly without having a concern of information leak from a transmission destination.

BRIEF DESCRIPTION OF DRAWINGS

FIG. 1 is a diagram showing one example of a functional block of an electronic converter according to Embodiment 1.

FIG. 3 is a schematic view showing one example of a configuration upon realizing, as hardware, each functional configuration of the electronic converter according to Embodiment 1.

FIG. 18 is a diagram showing one example of a flow of processing in the reverse electronic converter according to Embodiment 7.

DESCRIPTION OF EMBODIMENTS

Figure 2A:
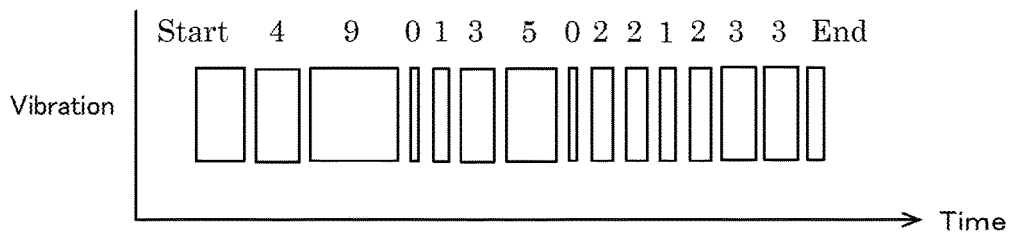
FIG. 2A is a diagram showing one example of a conversion rule held in a conversion rule holding unit of the electronic converter according to Embodiment 1 and a content thereof.

Hereinafter, each Embodiment according to the present invention will be described in conjunction with drawings. A mutual relationship between Embodiment and a claim is as described below. First, Embodiment 1 mainly corresponds to claims 1, 6, 11, 16, 30, 31 or the like. Embodiment 2 mainly corresponds to claims 2, 7, 12 or the like. Embodiment 3 mainly corresponds to claims 3, 4, 8, 9, 13, 14 or the like. Embodiment 4 mainly corresponds to claims 5, 10, 15 or the like. Embodiment 5 mainly corresponds to claims 17, 21, 25, 29, 30, 31 or the like. Embodiment 6 mainly corresponds to claims 18, 19, 22, 23, 26, 27 or the like. Embodiment 7 mainly corresponds to claims 20, 24, 28 or the like. In addition, the present invention is not limited by the Embodiments at all, and can be implemented in various aspects within the scope without departing from the spirit.

Functional Configuration of an Electronic Converter, or the Like

Embodiment 1

Outline

An electronic converter according to the present embodiment has features of generating vibration based on transaction information received from outside through a network. A risk of interception of communication upon transmitting and receiving sensitive transaction information such as personal information to and from a third party can be reduced by generating the vibration and reading the vibration in a proximate range.

Functional Configuration

FIG. 1 is a diagram showing one example of a functional block of an electronic converter according to the present embodiment. As shown in FIG. 1, an "electronic converter" 0100 according to the present embodiment has a "vibration generation unit" 0101, an "information receiving unit" 0102, a "conversion rule holding unit" 0103, a "conversion unit" 0104, and a "vibration generation control unit" 0105.

In addition, all the functional blocks of the electronic converters described below can be realized as hardware, software or both the hardware and the software. Specific examples of the functional block include, if the device uses a computer, a hardware configuration unit such as a CPU, a main memory, a GPU, an image memory, a graphic board, a bus, or an external peripheral device such as a secondary storage (a storage medium such as a hard disk, a nonvolatile memory and a memory card, or a reading drive for the media), an input device, a touch panel, a microphone or a speaker, to be used for information input, a display device such as a liquid crystal display, a plasma display or an organic electroluminescence display, a vibration generation device such as a vibrator, an ultrasonic wave generator and others, and an interface for the external peripheral device, a communication interface, a driver program and any other application program for controlling the above hardware. Then, the functional block is conceivably realized by a device using the above items, such as a personal digital assistant including a cellular phone and a smart phone, or a device such as a television and a radio. Then, through calculation processing in the CPU according to the program developed on the main memory, data input from an input device or other interfaces and held on the memory or the hardware is processed or accumulated, or a command for controlling each hardware or software described above is generated. The program described above herein may be realized as a plurality of modularized programs, or may be realized as one program formed by combining two or more programs.

In addition, the present invention can also be realized as a system by one device or by a combination of a plurality of devices. Then, a part of such a device can also be configured as the software. Further, the storage medium in which such software is recorded is obviously included in the technical scope of the present invention (a same rule applies not only to the present embodiment, but any matters through the whole of the present description including the description on a reverse converter).

The "vibration generation unit" 0101 is configured so as to generate the vibration based on a vibration generation signal. The "vibration" herein means vibration detectable only by a microphone having an ordinary function in the proximate range among physical vibrations, and does not include a sonic wave or an ultrasonic wave having propagation properties (however, an advantageous effect of the present invention can be obtained also by generating the ultrasonic wave in place of the vibration). The vibration is basically considered to be generated by the vibration generation device as the vibrator, in which the frequency thereof is adjusted to about 4,000 to 10,000 rpm. However, for example, a configuration of generating the vibration having a low frequency by applying voltage to a piezoelectric device may be adopted. As the "proximate range," for example, the vibration that is readable only within the range of a radius of 30 centimeters is desirable. The detectable range of the generated vibration is limited within the range very close to the vibration generation unit by adopting the configuration, and a risk of the interception is reduced. In addition, a specific method of controlling generation of the vibration will be described later in detail in association with the vibration generation control unit.

In addition, in the case of adopting the configuration of generating the ultrasonic in place of the vibration, the ultrasonic wave is basically generated by the ultrasonic wave generation device such as the speaker, and the frequency thereof is preferably adjusted to about 18,000 to 20,000 Hz. The ultrasonic wave generated can be detected even by the microphone ordinary equipped in a device such as a POS terminal used as the reverse electronic converter or the smart phone by adopting such a configuration.

The ultrasonic wave is preferably generated in such a manner that directivity is particularly intensified relative to a direction in which the ultrasonic wave is generated. Specifically, the ultrasonic wave preferably has unidirectionity or sharp directionality. The ultrasonic wave can be detected only in a limited range by adopting such a configuration, and therefore a concern on the interception and misuse of the generated ultrasonic wave by a third party can be reduced.

The "information receiving unit" 0102 is configured so as to receive the transaction information from outside through the network. Specifically, the information receiving unit receives the transaction information being one piece or a plurality of pieces of information used for specifying a transaction. As one example, the information receiving unit conceivably receives discount information being information for discounting a selling price of specific merchandise, or settlement information being information for price settlement in association with EC site use. As a specific receiving aspect, the information receiving unit conceivably receives the transaction information transmitted from an outside server through the network, and the information receiving unit directly or indirectly receives each transaction information transmitted, for example, from a server managed by a merchandise manufacturing company or sales company for the discount information, or from a server administered by an administrator of the EC site for the settlement information.

The "conversion rule holding unit" 0103 is configured so as to hold a conversion rule being a rule for converting the transaction information into the vibration generation signal. The "rule for converting the transaction information into the vibration generation signal" means a rule for representing meaningful information from a combination of a plurality of kinds of ON time length and/or OFF time length by repeating the ON time length and the OFF time length of the vibration within a short time length (for example, about several seconds or less) with a difference in length.

Moreover, in place thereof, such a rule may be applied as representing the meaningful information by combining a plurality of kinds of the number of vibrations (frequency) and/or strength of the vibration.

The transaction information is received as digital information, and therefore a numerical character, a symbol, a character or the like is represented by the meaningful information by the vibration. More specifically, the information received as the digital information is reproduced. Accordingly, the "conversion rule" serves as a rule for determining how the combination of the plurality of kinds of ON time length and/or OFF time length of the vibration is assigned to the numerical character, the symbol or the character, and in addition thereto, how the combination of the number of vibrations (frequency) and/or the strength of the vibration is assigned thereto.

In addition, a plurality of conversion rules may be held. In the above case, for example, a selection unit is conceivably provided, in which the selection unit selects the conversion rule associated with the transaction information among the plurality of conversion rules held, such as "select a conversion rule A when a convenience store is a counterparty," or "select a conversion rule B when an appliances retail store is a counterparty." If such a configuration is adopted, different vibration can be generated in corresponding to a content of the transaction information, and a risk of misuse of the information upon leakage of the information can be further reduced.

Figure 2B:
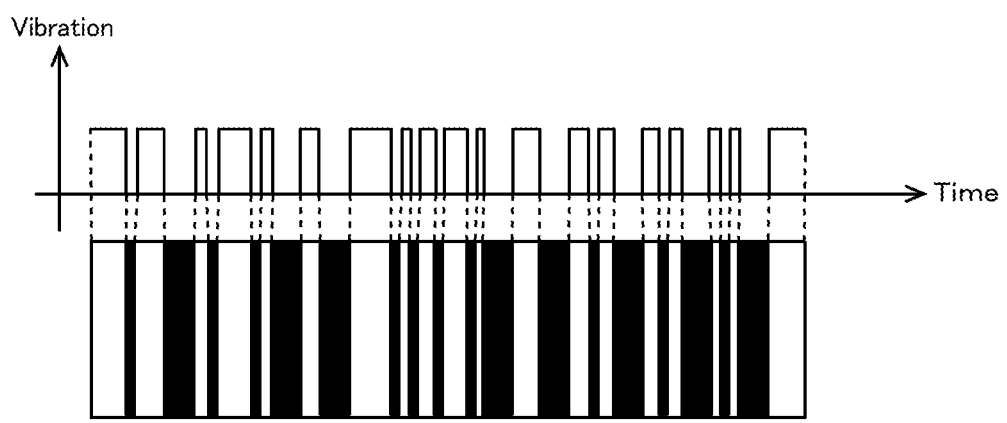
FIG. 2B is a diagram showing another example of a conversion rule held in the conversion rule holding unit of the electronic converter according to Embodiment 1 and the content thereof.
Figure 2C:
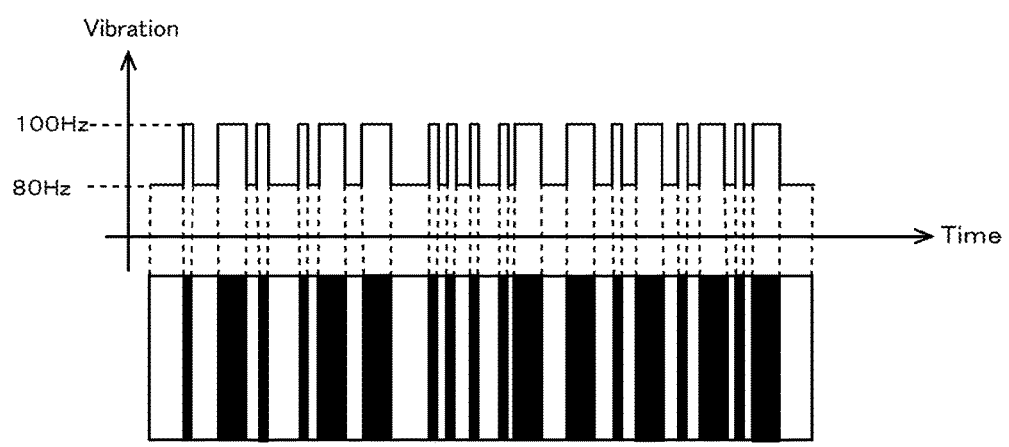
FIG. 2C is a diagram showing still another example of a conversion rule held in the conversion rule holding unit of the electronic converter according to Embodiment 1 and the content thereof.

FIG. 2A or FIG. 2C herein is shown for showing one example of a conversion rule. Both figures are a diagram showing one example of the conversion rule held in the conversion rule holding unit, and one example of the vibration generated based on the conversion rule. First, the example shown in FIG. 2A describes a conversion rule for determining a time for continuously generating the vibration to each numerical value that constitutes the transaction information. Specifically, as shown in an upper part in the figure, the vibration of 0.1 second is continuously generated relative to a numerical value "0," and the vibration of 0.5 second is continuously generated relative to a numerical value "4." Then, the number of vibrations generated in corresponding to each numerical value is determined (9,600 rpm in the example in the figure), respectively. In addition, such a rule is conceivable as generating the vibration having a content meaning generation start and generation end for a predetermined period of time at the generation start time and the generation end time of the vibration representing the transaction information (the vibration is continuously generated for 0.55 second at the generation start time and for 0.25 second at the generation end time in the example in the figure), and providing, during the generation of the vibration in corresponding to each numerical value, a time in which no vibration is generated for a predetermined period of time (for example, 0.15 second).

Moreover, the example shown in FIG. 2B shows a state of converting a barcode being the transaction information into the vibration generation signal. The vibration is configured to be repeatedly output at a predetermined time interval (for example, about one second interval or a three second interval). As shown in an upper part in the figure, a black bar (Black) and a white bar (White) that constitute the barcode are represented by the vibration, and therefore the conversion rule having a content in which no vibration is generated for the white bar part and the vibration is generated for the black bar part is held.

Further, FIG. 2C shows an aspect of holding a conversion rule having a content of generating vibration having a frequency of 80 Hz in a white bar part, and generating vibration having a frequency of 100 Hz in a black bar part.

In addition, as the conversion rule, in order to represent the generation start and the generation end of the vibration as described by using FIG. 2A, or in order to represent switching of aspects of the vibration such as the black bar part and the white bar part, an information content change rule being a rule for generating the vibration for representing a change in the above information content may be provided as the content of the conversion rule. Reading accuracy of the vibration can be improved by using, for the transaction, the vibration converted based on the conversion rule including the content.

The "conversion unit" 0104 is configured so as to convert the transaction information received by the information receiving unit from outside through the network into the vibration generation signal based on the conversion rule held in the conversion rule holding unit. The conversion processing is preferably performed immediately before the vibration is generated in the vibration generation unit. If such a configuration is adopted, occurrence of an event can be prevented in which the vibration is generated at originally unnecessary timing by user's erroneous operation or the like to cause a disadvantage in the transaction.

The "vibration generation control unit" 0105 is configured so as to control the vibration generation unit based on the vibration generation signal converted in the conversion unit. Specifically, as the example described by using FIG. 2A or FIG. 2C, the vibration generation control unit performs control so as to generate the vibration in corresponding to the transaction information. As one example of a further specific control aspect, the vibration based on the vibration generation signal is conceivably repeatedly output by a predetermined number of times. In the above case, the vibration having the same content is conceivably repeatedly generated to a device for detecting the vibration and detected by the device by a plurality of times at a predetermined time interval. Thus, detection accuracy on a side of the detection device upon detecting the output vibration (a detailed description will be given in and after Embodiment 4) can be improved.

Example 1

One example of an electronic converter in which the configuration as described above is adopted is conceivably a personal digital assistant such as a cellular phone and a smart phone. In the above case, transaction information is acquired from an outside server device or the like, and converted into vibration or an ultrasonic wave to output the converted information to a POS terminal or the like. Thus, the transaction can be safely performed at a store without having a risk of interception or misuse by a third party.

Example 2

In addition, another example of an electronic converter can include a device such as a television, a radio or a personal computer. In the above case, transaction information transmitted from a manufacturer or merchandise selling store side is acquired, and converted into an ultrasonic wave to output the ultrasonic wave to a personal digital assistant such as a cellular phone and a smart phone. Thus, the transaction information on specific merchandise or the transaction information that can be used in the transaction at a specific store can be provided for an unspecified number of consumers, and can be used as sales promotion information for turning the consumers' steps toward the store.

Example 3

Still another example of an electronic converter can also include an outside server independent of a terminal possessed by a user or a terminal managed by a store or the like. In the above case, transaction information is acquired from the terminal possessed by the user, and converted into vibration or an ultrasonic wave to generate the vibration or the ultrasonic wave to a POS terminal or the like. As one example of a generation aspect of the vibration or the ultrasonic wave herein, a configuration is conceivable in which a user agent such as a web browser is used, or the like. The transaction can be performed even at any terminal under an environment in which the user agent such as the web browser can use without introducing a special application to the terminal possessed by the user or the terminal managed by the store or the like by adopting such a configuration.

Specific Configuration

FIG. 3 is a schematic view showing one example of a configuration upon realizing, as hardware, each functional configuration of the electronic converter according to the present embodiment. As shown in the figure, the electronic converter according to the present embodiment is equipped with a "CPU" 0301 for executing each calculation processing, a "storage device (storage medium)" 0302, a "main memory" 0303, a "network interface" 0360, an "input interface" 0370 and an "output interface" 0380 to transmit and receive information to and from, for example, an "external device" 0361 through a network interface, and to and from, for example, a peripheral device such as a "touch panel" 0371, a "microphone" 0372, a "speaker" 0381, a "display" 0382, and a "vibration generation unit" 0383 such as a vibration generator, through an input/output interface. Incidentally, the electronic converter according to the present embodiment transmits and receives the information to and from a "reverse electronic converter" 0390 to be described later through the peripheral device such as the vibration generation unit, the speaker, and the display. In addition, various programs as described below are housed in the storage device, and the CPU reads the various programs into a work area of the main memory to develop and execute the programs. In addition, the above configurations are connected with each other by a data communication route such as a "system bus" 0399 to transmit and receive or process the information.

Specific Processing in the Information Receiving Unit

The CPU reads an "information receiving program" 0320 from the storage device to the main memory to execute the program, and receives the transaction information transmitted from an outside device, and house the information in a predetermined address of the main memory.

Specific Processing in the Conversion Unit

The CPU reads a "conversion program" 0330 from the storage device to the main memory to execute the program, and convert the transaction information acquired by executing the information receiving program into the vibration generation signal based on the conversion rule to perform processing of housing the results in a predetermined address of the main memory.

Specific Processing in the Vibration Generation Control

The CPU reads a "vibration generation control program" 0340 from the storage device to the main memory to execute the program to perform processing of controlling the vibration generation unit based on the vibration generation signal obtained by executing the conversion program.

Specific Processing in the Vibration Generation Unit

The CPU reads a "vibration generation program" 0310 from the storage device to the main memory to execute the program to perform processing of generating the vibration based on the vibration generation signal.

Flow of Processing

Figure 4:
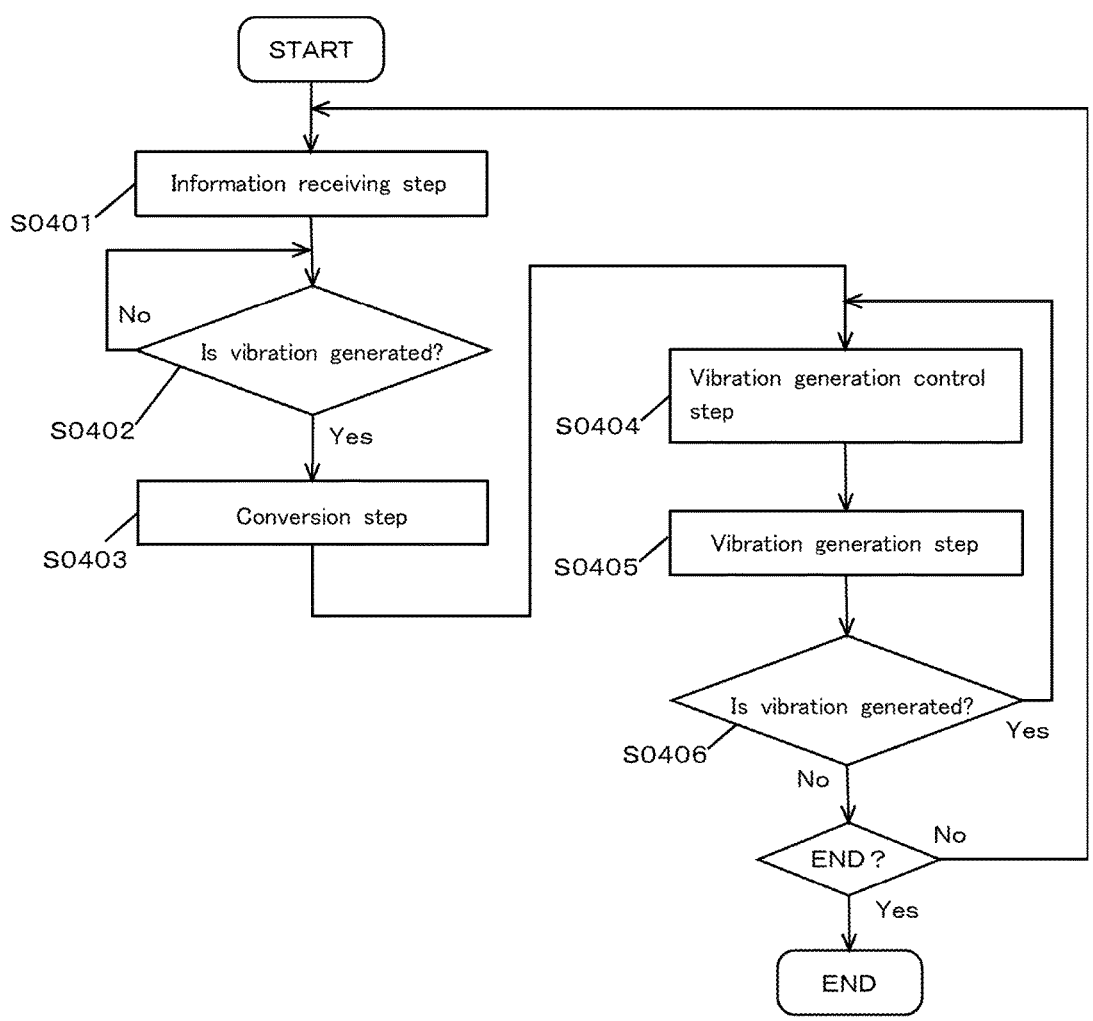
FIG. 4 is a diagram showing one example of a flow of processing in the electronic converter according to Embodiment 1.

FIG. 4 is a diagram showing one example of a flow of processing in the electronic converter according to the present embodiment. The flow of processing in the figure includes the following steps. First, in a step S0401, transaction information is received (information receiving step). Then, in a step S0402, whether or not vibration is generated is judged. In the case of the judgement results to the effect of generating the vibration, the flow proceeds to processing in a step S0403, and in the case of the judgment result to the effect of not generating the vibration, subsequent processing is not performed. In a step S0403, the transaction information received from outside through a network in the information receiving step is converted into a vibration generation signal based on a predetermined conversion rule (conversion step).

Then, in a step S0404, processing for controlling the vibration generation unit based on the vibration generation signal converted in the conversion step is performed (vibration generation control step), and simultaneously in a step S0405, the vibration is generated based on the vibration generation signal as determined in the vibration generation control step (vibration generation step). In addition, whether or not the vibration is generated again is judged in a step 0406, and in the case of the judgement results to the effect of generating the vibration, processing in and after the step S0404 is further performed. In the case of the judgment results to the effect of not generating the vibration, subsequent processing is not performed.

In addition, in the flow of processing described above, the conversion step may be executed before performing the judgement, in the step S0402, whether or not the vibration based on the received information is generated.

Effect

The transaction information can be safely and smoothly transmitted by utilizing the electronic converter having the configuration described above in such a manner that a transmission source of the information has no concern on the information leak from a transmission destination.

Embodiment 2

Outline

An electronic converter according to the present embodiment is basically similar to the electronic converter according to Embodiment 1, but the electronic converter further has features of having an accompanying information generation unit for generating at least any one of a sonic wave, an ultrasonic wave, a still image and a moving image simultaneously when the vibration generation unit generates the vibration. Authenticity of generation of the vibration can be confirmed by another means to perform a double check on a side of a transaction information detector by adopting such a configuration.

Functional Configuration

Figure 5:
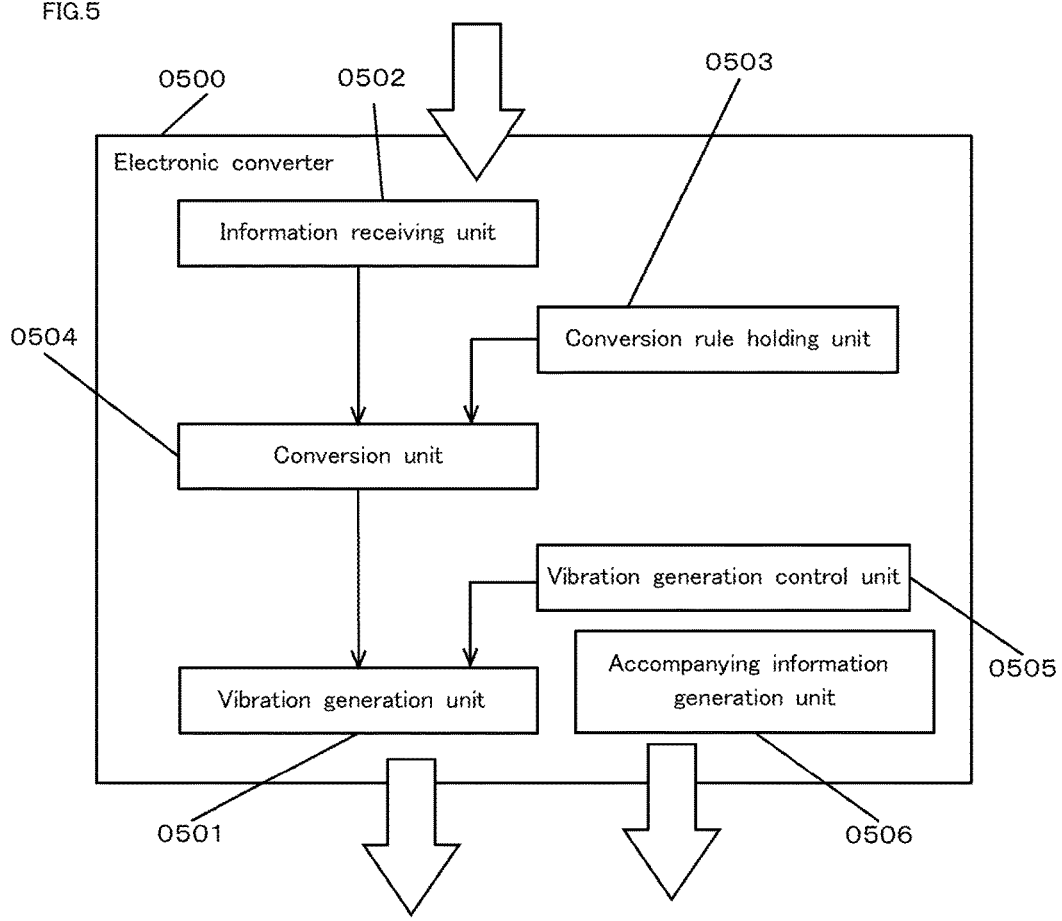
FIG. 5 is a diagram showing one example of a functional block of the electronic converter according to Embodiment 2.

FIG. 5 is a diagram showing one example of a functional block of the electronic converter according to the present embodiment. As shown in FIG. 5, an "electronic converter" 0500 according to the present embodiment has a "vibration generation unit" 0501, an "information receiving unit" 0502, a "conversion rule holding unit" 0503, a "conversion unit" 0504, a "vibration generation control unit" 0505 and an "accompanying information generation unit" 0506. A basic configuration is common with the electronic converter described using FIG. 1 in Embodiment 1, and therefore a function of the "accompanying information generation unit" 0506 being a difference will be described below.

The "accompanying information generation unit" 0506 is configured so as to generate at least any one of the sonic wave, the ultrasonic wave, the still image and the moving image simultaneously when the vibration generation unit generates the vibration. The expression "so as to generate simultaneously when the vibration generation unit generates the vibration" means generation of at least any one of the sonic wave, the ultrasonic wave, the still image and the moving image while the vibration generation unit generates the vibration, in which incessant generation of at least any one or the sonic wave, the ultrasonic wave, the still image and the moving image is unnecessary while the vibration is generated. Moreover, timing at which the vibration is generated is not necessarily identical with timing at which at least any one of the sonic wave, the ultrasonic wave, the still image and the moving image is generated, either. In addition, when the ultrasonic wave associated with the transaction information is generated, an ultrasonic wave having a frequency deferent from the frequency of the above ultrasonic wave is conceivably generated as accompanying information.

In addition, all of the sonic wave, the ultrasonic wave, the still image and the moving image are information that is unnecessary to be associated with the specific transaction, and are differentiated from the transaction information that has been described so far. More specifically, the information associated with the specific transaction information, and the information not associated with the specific information are simultaneously provided for a user of the electronic converter and a counterparty of the user by adopting the configuration according to the present embodiment. Accordingly, the counterparty can judge to the effect that the transaction is a fair transaction only when both are fair by combining not only the vibration but also the accompanying information, and can more carefully judge fairness of the counterparty.

Incidentally, when a signal generated in the accompanying information generation unit is the sonic wave, the sonic wave is preferably generated at an audio frequency (for example, 1 kHz or the like) higher than the frequency of the vibration generated in the vibration generation unit. If such a configuration is adopted, the sonic wave is generated as the accompanying information and propagates to a periphery during generation of the vibration, and therefore a concern of misuse in which the vibration propagates to the surrounding and the vibration is duplicated by a third party, or the like can be relatively reduced.

Specific Configuration

A hardware configuration of the electronic converter according to the present embodiment is basically similar to the hardware configuration of the electronic converter described using FIG. 3 in Embodiment 1. Then, specific processing in the "accompanying information generation unit" that has been not described so far will be described below.

Specific Processing in the Accompanying Information Generation Unit

The CPU reads an "accompanying information generation program" from the storage device to the main memory to execute the program to generate at least any one of the sonic wave, the still image and the moving image simultaneously when the vibration generation unit generates the vibration.

Flow of Processing

Figure 6:
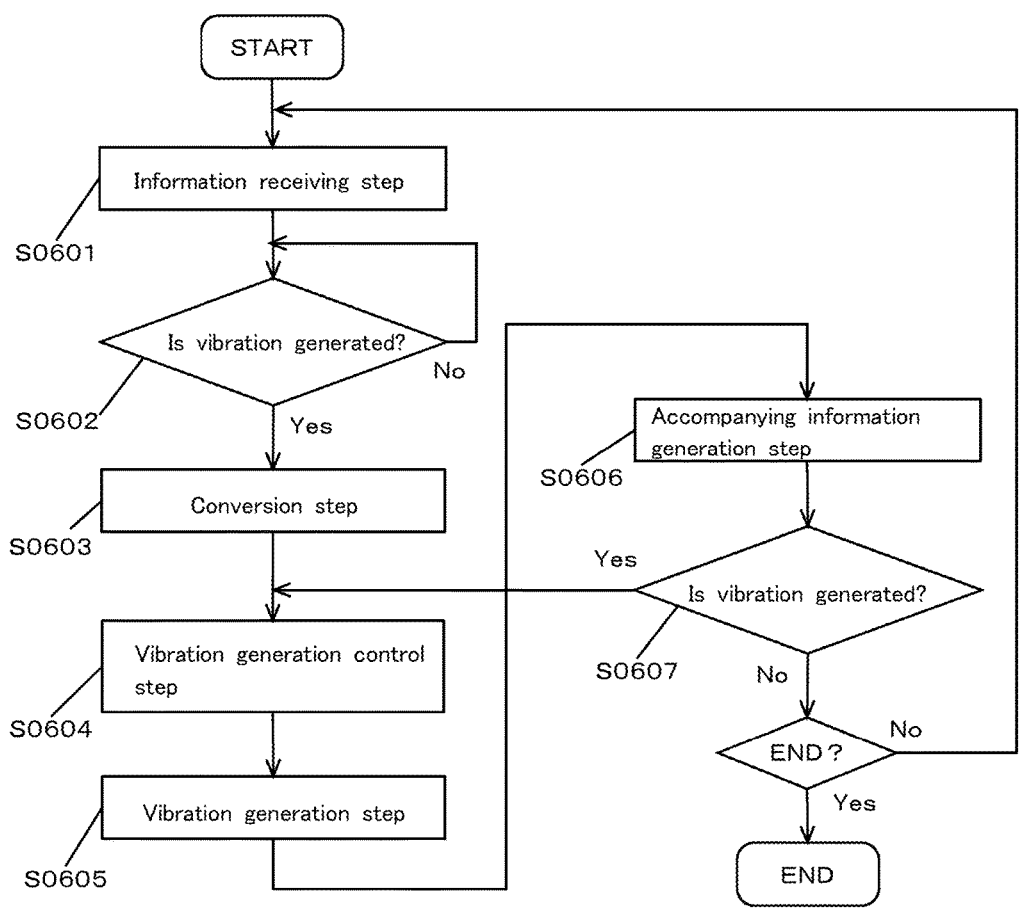
FIG. 6 is a diagram showing one example of a flow of processing in the electronic converter according to Embodiment 2.

FIG. 6 is a diagram showing one example of a flow of processing in the electronic converter according to the present embodiment. The flow of processing in FIG. 6 includes the following steps. First, in a step S0601, transaction information is received (information receiving step). Then, in a step S0602, whether or not vibration is generated is judged. In the case of the judgement results to the effect of generating the vibration, the flow proceeds to processing in a step S0603, and in the case of the judgement result to the effect of not generating the vibration, subsequent processing is not performed. In a step S0603, the transaction information received from outside through a network in the information receiving step is converted into a vibration generation signal based on a predetermined conversion rule (conversion step).

Then, in a step S0604, processing for controlling the vibration generation unit based on the vibration generation signal converted in the conversion step is performed (vibration generation control step), and in a step S0605, the vibration is generated based on the vibration generation signal in a determined manner in the vibration generation control step (vibration generation step). In addition, in a step S0606, at least any one of the sonic wave, the ultrasonic wave, the moving image or the still image is generated simultaneously when the vibration is generated in the vibration generation step (accompanying information generation step). The order of processing in the vibration generation step and in the accompanying information generation step herein may be reversed.

Then, whether or not the vibration is generated again is judged in a step S0607, and in the case of the judgement result to the effect of generating the vibration, processing in and after the step S0604 is further performed. In the case of the judgement results to the effect of not generating the vibration, subsequent processing is not performed.

Effect

If the configuration of the present embodiment is adopted, even if a third party fraudulently acquires the transaction information to convert the information into the vibration and generate the vibration, authenticity of generation of the vibration cannot be recognized by a counterparty unless the sonic wave, the ultrasonic wave, the still image and the moving image are simultaneously generated, and therefore authenticity of the counterparty can be more carefully recognized on a side of a transaction information detector.

Embodiment 3

Outline

An electronic converter according to the present embodiment is basically similar to the electronic converter described in Embodiment 1 or 2, but the electronic converter further has an information display unit for displaying transaction information received from outside through a network as the features. Authenticity of the transaction information can be more carefully judged by a third party by adopting the configuration according to which that the transaction information is output in an aspect different from the aspect of the vibration.

Functional Configuration

Figure 7:
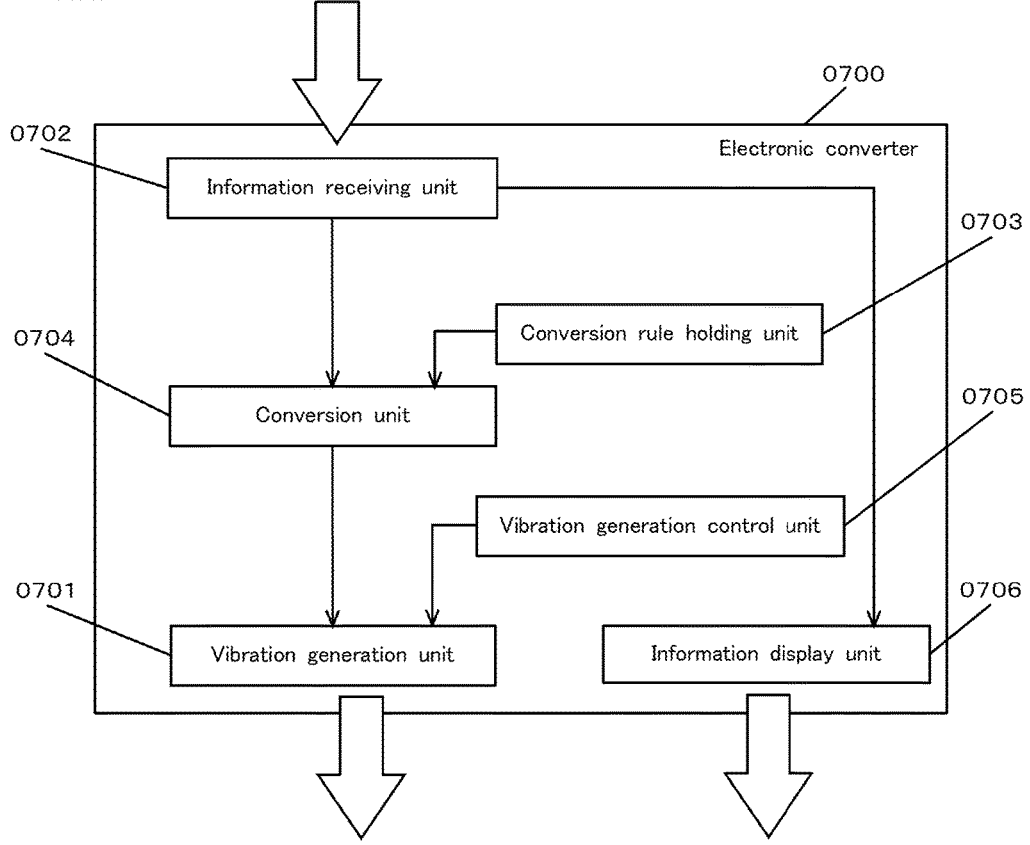
FIG. 7 is a diagram showing one example of a functional block of the electronic converter according to Embodiment 3.

FIG. 7 is a diagram showing one example of a functional block of the electronic converter according to the present embodiment. As shown in FIG. 7, an "electronic converter" 0700 has a "vibration generation unit" 0701, an "information receiving unit" 0702, a "conversion rule holding unit" 0703, a "conversion unit" 0704, a "vibration generation control unit" 0705 and an "information display unit" 0706. A basic configuration is common with the electronic converter described using FIG. 1 in Embodiment 1, and therefore a function of the "information display unit" 0706 being a difference will be described below.

The "information display unit" 0706 is configured so as to display the transaction information received from outside through a network. In addition to the case where the transaction information received from outside through the network is displayed in an intact aspect, for example, the transaction information received from outside through the network can also be considered to be displayed as a code. If such a configuration is adopted, the displayed code (barcode, two-dimensional code, or the like) can be simply read by using a reading device such as a code reader.

The information displayed on the information display unit needs to be the transaction information, and the still image or the moving image generated in the accompanying information generation unit as described in Embodiment 2 is excluded from a displaying object herein. However, in the information display unit, the transaction information having a content identical with the content of information associated with the vibration generated in the vibration generation unit may be displayed, or the transaction information having a content partially or wholly different therefrom may be displayed. As one example when the transaction information having the content different therefrom is displayed, the case is conceivable where a part of the transaction information received from outside through the network is displayed in the information display unit, and with regard to the other part, the vibration is configured to be generated in the vibration generation unit.

Thus, when a part of one piece of the transaction information is generated in the vibration generation unit and the information display unit in a divided manner, the vibration generation control unit is preferably equipped with a partial vibration generation control means for controlling so as to generate the vibration for information other than the information to be displayed, with regard to the information received from outside through the network.

Moreover, generation of the vibration in the vibration generation unit, and display of the information in the information display unit need not be necessarily performed simultaneously. Accordingly, for example, a sequential generation control unit for controlling processing may be provided in which either processing of generating the vibration or processing of displaying the information is first performed to allow the outside device to detect the generation results, and a signal to the effect that the detection results are fairly processed is received, and then the other processing of generation or display is performed. If the above configurations is adopted, the transaction information can be presented in an output aspect in which the display and the vibration are different, and therefore even if the information output in any one of aspects is leaked to outside, a situation of misuse of the information can be prevented. Moreover, if such a configuration is adopted, as a detection device of the transaction information, a device such as a POS terminal having a function that has been so far provided for the device that reads code information can be appropriated in the present invention.

Specific Configuration

A hardware configuration of the electronic converter according to the present embodiment is basically similar to the hardware of the electronic converter described using FIG. 3 in Embodiment 1. Then, specific processing in the "information display unit" that has not been described so far will be described below.

(Specific Processing in the Information Display Unit)

The CPU reads an "information display program" from the storage device to the main memory to execute the program to display and output transaction information acquired by executing the information receiving program. In the above case, a configuration according to which only a part of information determined by a predetermined rule is displayed may be adopted.

Flow of Processing

Figure 8:
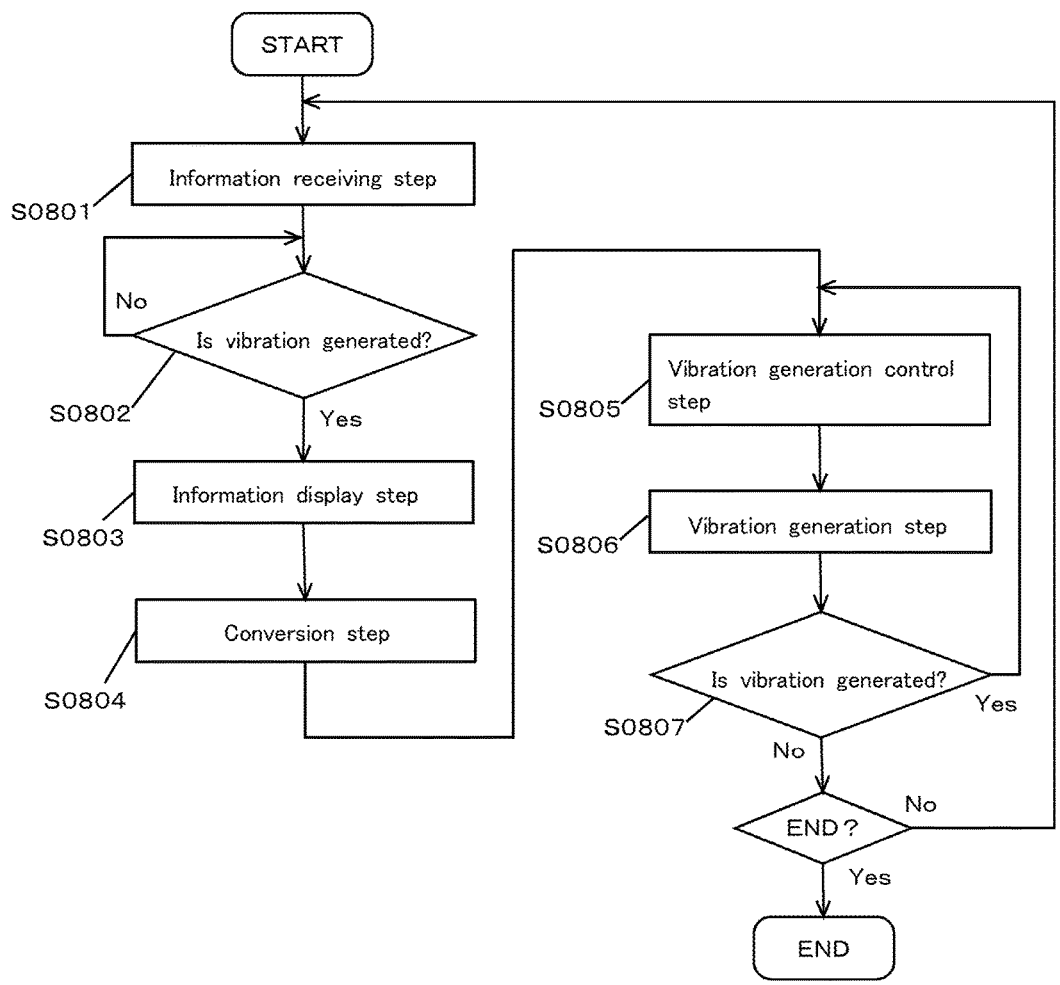
FIG. 8 is a diagram showing one example of a flow of processing in the electronic converter according to Embodiment 3.

FIG. 8 is a diagram showing one example of a flow of processing in the electronic converter according to the present embodiment. The flow in the figure includes the following steps. First, in a step S0801, transaction information is received (information receiving step). Then, in a step S0802, whether or not vibration is generated is judged. In the case of the judgement results to the effect of generating the vibration, the flow proceeds to processing in a step S0803, and in the case of the judgement results to the effect of not generating the vibration, subsequent processing is not performed. In a step S0803, transaction information received from outside through a network in the information receiving step is displayed (information display step), and in a step S0804, the transaction information received from outside through the network in the information receiving step is converted into a vibration generation signal based on a predetermined conversion rule (conversion step).

Then, in a step S0805, processing for controlling the vibration generation unit based on the vibration generation signal converted in the conversion step is performed (vibration generation control step), and in a step S0806, the vibration is generated based on the vibration generation signal in a determined manner in the vibration generation control step (vibration generation step). In addition, in a step S0807, whether or not the vibration is generated again is judged, and in the case of the judgement results to the effect of generating the vibration, processing in after the step S0805 is further performed. In the case of the judgement results to the effect of not generating the vibration, subsequent processing is not performed.

In addition, the order of processing in the information display step is not limited to the above description, and the processing in the information display step may be performed, for example, after the vibration generation step.

Effect

Authenticity of the transaction information can be more carefully judged relative to a third party by adopting the above configuration in which the transaction information is output in an aspect different from the vibration.

Embodiment 4

Outline

An electronic converter according to the present embodiment is basically similar to the electronic converter described in any one of Embodiments 1 to 3. However, the electronic converter has, as further features, a conversion rule holding unit having a redundancy conversion rule holding means for holding a redundancy conversion rule being a rule for performing redundancy conversion of information received from outside through a network in order to improve noise resistance during outputting vibration obtained by converting transaction information received from outside through the network as a conversion rule, in which the conversion unit has a redundancy conversion means for converting the transaction information based on the redundancy conversion rule held in the redundancy conversion rule holding means. The information can be transmitted and received more precisely, by adopting such a configuration, even under an environment in which the noise is easily generated.

Functional Configuration

Figure 9:
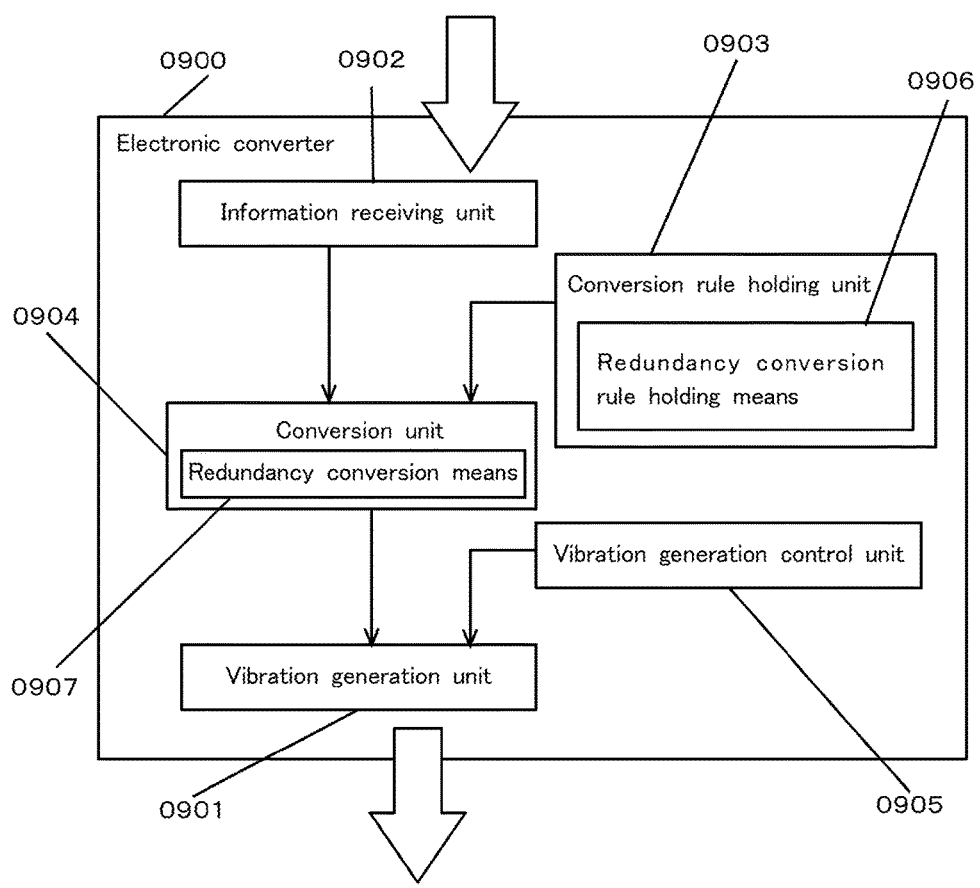
FIG. 9 is a diagram showing one example of a functional block of an electronic converter according to Embodiment 4.

FIG. 9 is a diagram showing one example of a functional block of the electronic converter according to the present embodiment. As shown in FIG. 9, an "electronic converter" 0900 according to the present embodiment has a "vibration generation unit" 0901, an "information receiving unit" 0902, a "conversion rule holding unit" 0903, a "conversion unit" 0904 and a "vibration generation control unit" 0905, in which the conversion rule holding unit has a "redundancy conversion rule holding means" 0906, and the conversion unit has a "redundancy conversion means" 0907. A basic configuration is common with the electronic converter described using FIG. 1 in Embodiment 1, and therefore a function of the "redundancy conversion rule holding means" 0906 and the "redundancy conversion means" 0907 being a difference will be described below.

The redundancy conversion rule holding means 0906 is configured so as to hold a redundancy conversion rule being a rule for performing redundancy conversion of the information received from outside through a network, in the conversion rule holding unit, in order to improve noise resistance during outputting vibration obtained by converting transaction information received from outside through the network as the conversion rule. For example, the redundancy conversion rule having a content of converting the same transaction information into a plurality of vibration signals is conceivably held. The plurality of vibration signals herein means a case of having a content of generating vibration (oscillation, an ultrasonic wave, a sonic wave or the like) in a plurality of aspects, and also a case of having a content of generating the same kind of vibration in a different aspect. In any case, even if the vibration is not suitably generated for any reason, the vibration can be generated based on a suitable vibration generation signal by any other means by adopting such a configuration, and therefore the vibration can be further securely detected by a reverse electronic converter.

The "redundancy conversion means" 0907 is configured to convert the transaction information based on the redundancy conversion rule held in the redundancy conversion rule holding means in the conversion unit. A specific aspect of conversion is similar to the aspect already described in the redundancy conversion rule holding means.

Specific Configuration

A hardware configuration of the electronic converter according to the present embodiment is basically similar to the hardware configuration of the electronic converter described using FIG. 3 in Embodiment 1. Then, specific processing in the "redundancy conversion means" that has not been described so far will be described below.

Specific Processing in the Redundancy Conversion

The CPU reads a "redundancy conversion subprogram" from the storage device to the main memory to execute the program upon executing a conversion program to perform processing of converting transaction information based on the redundancy conversion rule held.

Flow of Processing

Figure 10:
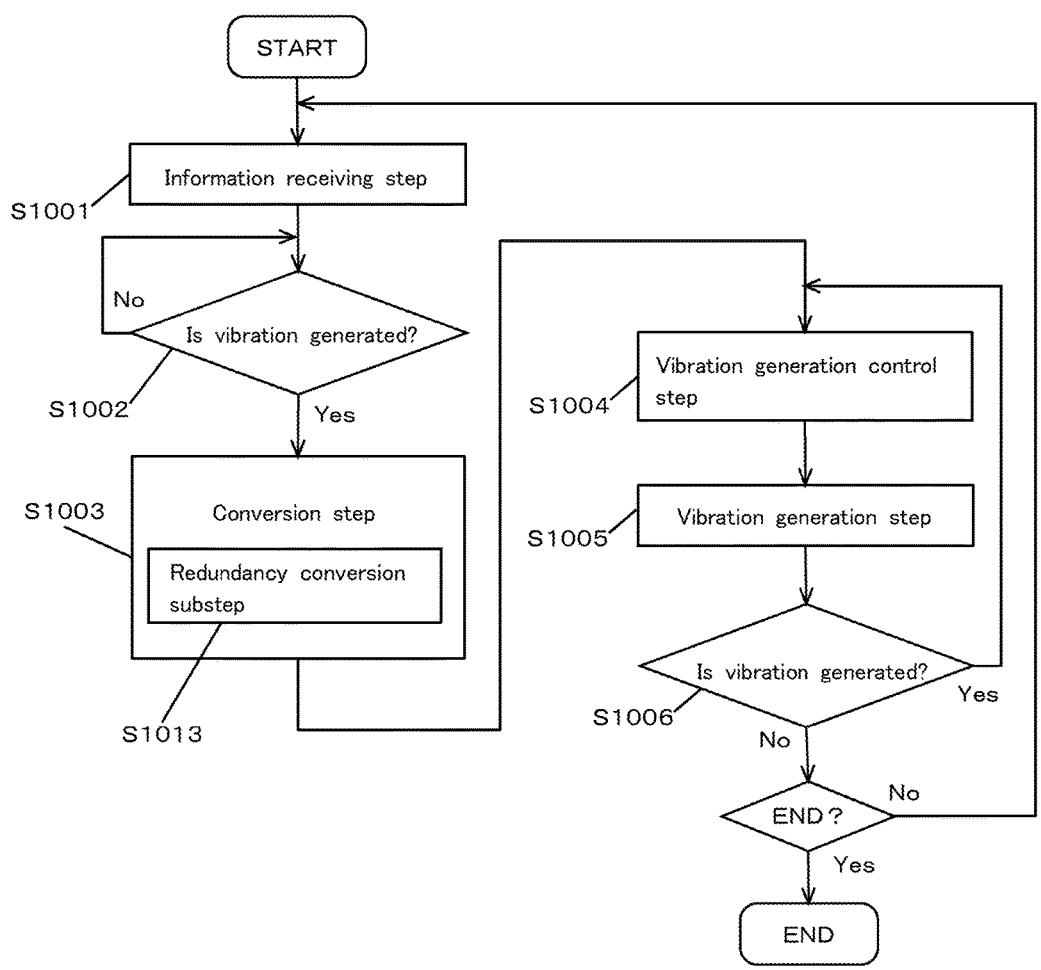
FIG. 10 is a view showing another example of a flow of processing in the electronic converter according to Embodiment 4.

FIG. 10 is a diagram showing one example of a flow of processing in the electronic converter according to the present embodiment. The flow in the figure includes the following steps. First, in a step S1001, transaction information is received (information receiving step). Then, in a step S1002, whether or not vibration is generated is judged. In the case of the judgement results of generating the vibration, the flow proceeds to processing in a step S1003, and in the case of the judgement results of not generating the vibration, subsequent processing is not performed. In a step S1003, transaction information received from outside through a network in the information receiving step is converted into a vibration generation signal based on a predetermined rule (conversion step). In addition, on the above occasion, the transaction information is converted into the vibration generation signal based on the redundancy conversion rule being a rule for performing redundancy conversion in corresponding to the transaction information received from outside through the network (redundancy conversion sub-step).

Then, in a step S1004, processing for controlling the vibration generation unit is performed based on the vibration generation signal converted in the conversion step (vibration generation control step), and simultaneously in a step S1005, the vibration is generated based on the vibration generation signal in a determined manner in the vibration generation control step (vibration generation step). In addition, in a step S1006, whether or not the vibration is generated again is judged, and in the case of the judgement results of generating the vibration, processing in and after the step S1004 is further performed. In the case of the judgement results of not generating the vibration, subsequent processing is not performed.

In addition, in the flow of processing described above, the conversion step may be executed before judgement whether or not the vibration based on the received information is generated is performed in the step S1002.

Effect

The information can be transmitted and received further adequately by utilizing the electronic converter having the configuration as described above, even under an environment in which noise is easily generated.

Functional Configuration of the Reverse Electronic Converter and so Forth

Embodiment 5

Outline

A reverse electronic converter according to the present embodiment has features of detecting vibration generated in the electronic converter described in any of Embodiments 1 to 4 to convert the vibration into transaction information. Transaction can be fulfilled performed without leaking transaction information to a third party by utilizing the reverse electronic converter. Specifically, such transaction can be realized by a POS register terminal, but even by a separate device used by connecting with the POS register terminal, the same effect can be received.

Functional Configuration

Figure 11:
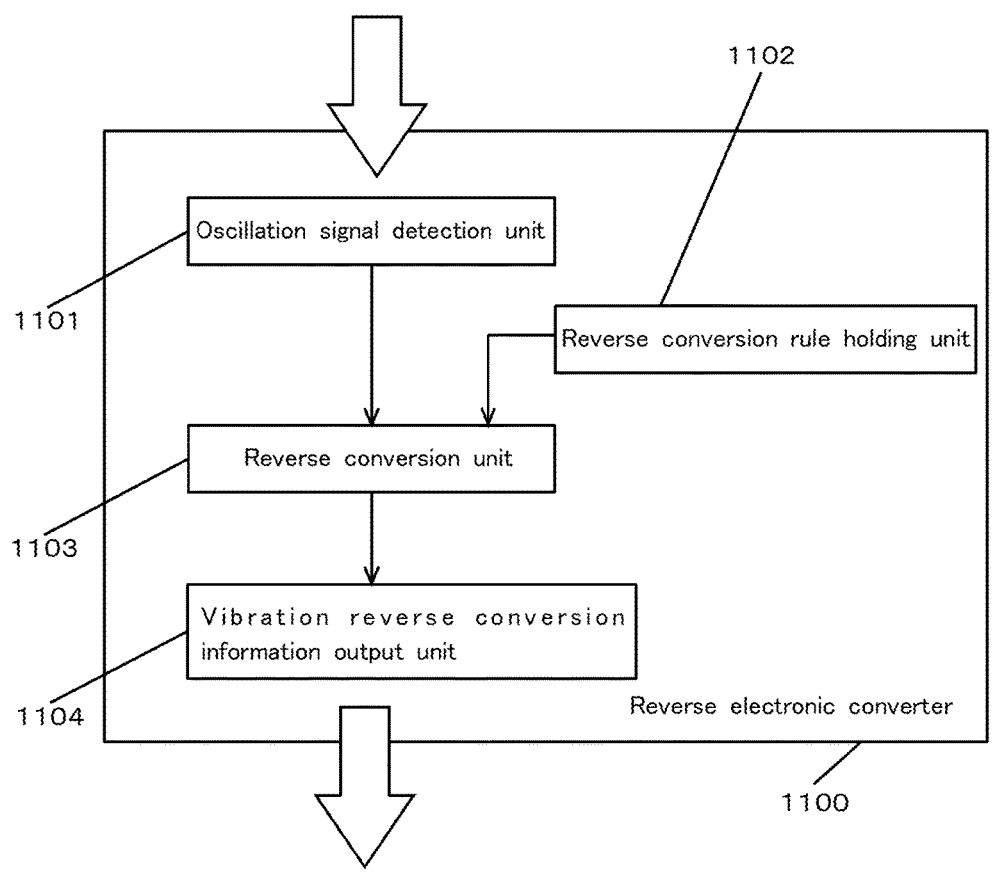
FIG. 11 is a diagram showing one example of a functional block of the reverse electronic converter according to Embodiment 5.

FIG. 11 is a diagram showing one example of a functional block of the reverse electronic converter according to the present embodiment. As shown in FIG. 11, a "reverse electronic converter" 1100 according to the present embodiment has an "oscillation signal detection unit" 1101, a "reverse conversion rule holding unit" 1102, a "reverse conversion unit" 1103 and a "vibration reverse conversion information output unit" 1104.

All functional blocks of the reverse electronic converter described below can also be realized as hardware, software or both of hardware and software in a manner similar to the electronic converter. Specific examples of the functional block include, if the device uses a computer, a hardware configuration unit such as a CPU, a main memory, a GPU, an image memory, a graphics board, a bus, or an external peripheral device such as a secondary storage (a storage medium such as a hard disk, a nonvolatile memory, CD and DVD, and a reading drive for the media), an input device, to be used for information input, a touch panel, an optical reading device such as a barcode reader, a microphone, a speaker, a sensor device such as a vibration sensor, and others; an interface for the external peripheral device and a communication interface; and a driver program and other application programs for controlling the above hardware. Then, through calculation processing in the CPU according to the program developed on the main memory, data input from the input device or other interfaces and held on the memory or hardware is processed or accumulated, or a command for controlling each hardware or software described above is generated. The above program herein may be realized as a plurality of modularized programs, or may be realized as one program formed by combining two or more programs.

The reverse electronic converter can also be realized as a system by one device or a combination with a plurality of devices. Then, a part of such a device can also be configured as software. Further, the storage medium having such software recorded thereon is obviously included in the technical scope of the present invention The "oscillation signal detection unit" 1101 is configured so as to detect the vibration generated in the electronic converter described in any of Embodiments 1 to 4 as an oscillation signal. A specific detection aspect corresponds to a generation aspect of the vibration, and if the vibration is oscillation, for example, the vibration is conceivably detected using an oscillation sensor, an oscillation sound of the vibration may be detected using a sound-collecting device such as a microphone.

Detection of the oscillation signal is preferably performed repeatedly at predetermined timing. As a specific example, the vibration repeatedly generated at one cycle is judged as one oscillation signal among vibrations detected within a predetermined time (for example, for 1 second or 3 seconds). If such a configuration is adopted when the vibration having the same content is repeatedly generated at a predetermined interval in the electronic converter, omission of detection of the vibration can be avoided.

The "reverse conversion holding unit" 1102 is configured so as to hold a reverse conversion rule being a rule for converting the detected oscillation signal into transaction information. The reverse conversion rule held herein is associated with the conversion rule held in the conversion rule holding unit of the electronic converter, and specifically is associated with the conversion rule exemplified in FIG. 2A or FIG. 2C. The reverse conversion rule is associated with the conversion rule, and thus the reverse conversion rule can be used as a rule for decoding the detected oscillation signal to the transaction information converted into the vibration generation signal in the conversion unit of the electronic converter.

The "reverse conversion unit" 1103 is configured so as to perform reverse conversion of the oscillation signal detected in the oscillation signal detection unit into the transaction information according to the reverse conversion rule held in the reverse conversion rule holding unit. Specific processing for the reverse conversion may be executed by an appropriate program.

The "vibration reverse conversion information output unit" 1104 is configured so as to output the transaction information reversely converted in the reverse conversion unit. A specific output destination is appropriately different in corresponding to a content of the transaction information, and for example, when the transaction information is settlement information, the transaction information is output to a server managed by a business operator such as an EC site operator being a counterparty of the settlement, and settlement processing is performed. If the transaction information is discount information, the transaction information is output to a POS terminal, and processing for discounting a price of target merchandise or the like is performed.

Example 3

One example of a reverse electronic converter in which the configuration as described above is adopted is conceivably a device used for settlement, such as a POS terminal. In the above case, vibration or an ultrasonic wave generated from a personal digital assistant being an electronic converter used by a consumer is detected and used for the transaction. Thus, an event in which transaction information of the customer is leaked to a third party in an unauthorized manner can be prevented to provide a safe transaction environment.

Example 4

In addition, when a device such as a television, a radio and a personal computer is an electronic converter, the personal digital assistant of the customer as described above or the like may serve as the reverse electronic converter. The personal digital assistant or the like that detects vibration or an ultrasonic wave generated from the above electronic converters acquires transaction information based on the detection results to further output the acquired transaction information to a POS terminal or the like, and such information can be used for the transaction.

Specific Configuration

Figure 12:
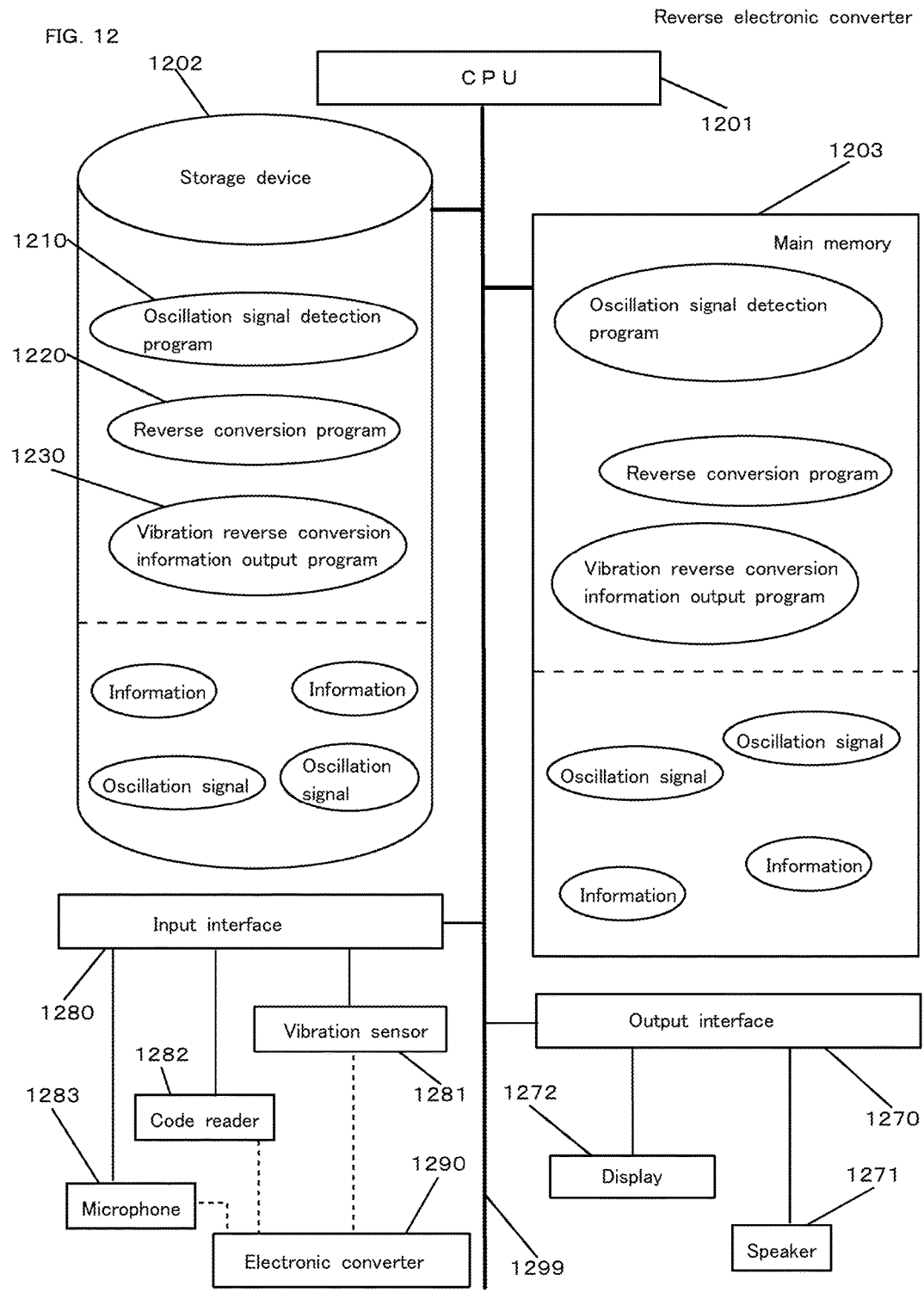
FIG. 12 is a schematic view showing one example of a configuration upon realizing, as hardware, each functional configuration of the reverse electronic converter according to Embodiment 5.

FIG. 12 is a schematic view showing one example of a configuration upon realizing, as hardware, each functional configuration of the reverse electronic converter according to the present embodiment. As shown in the figure, the reverse electronic converter according to the present embodiment is equipped with a "CPU" 1201, a "storage device (storage medium)" 1202, a "main memory" 1203, an "output interface" 1204 and an "input interface" 1205, and transmits and receives information to and from an external peripheral device such as a "touch panel" 1206, a "microphone" 1207, a "code reader" 1208 and a "display" 1209. In addition, various programs as described below are housed in the storage device, and the CPU reads the various programs into a work area of the main memory to develop and execute the programs. In addition, the above configurations are connected with each other by a data communication route such as a "system bus" 1299 to transmit and receive or process the information.

Specific Processing in the Oscillation Signal Detection Unit

The CPU reads an "oscillation signal detection program" 1210 from the storage device to the main memory to execute the program to perform processing of detecting the vibration generated in the electronic converter as an oscillation signal.

Specific Processing in the Reverse Conversion Unit

The CPU reads a "reverse conversion program" 1220 from the storage device to the main memory to execute the program to perform processing of converting the oscillation signal obtained by executing the oscillation signal detection program into the transaction information according to the reverse conversion rule.

Specific Processing in the Vibration Reverse Conversion Information Output Unit

The CPU reads a "vibration reverse conversion information output program" 1230 from the storage device to the main memory to execute the program to perform processing of outputting the transaction information acquired by executing the reverse conversion program.

Flow of Processing

Figure 13:
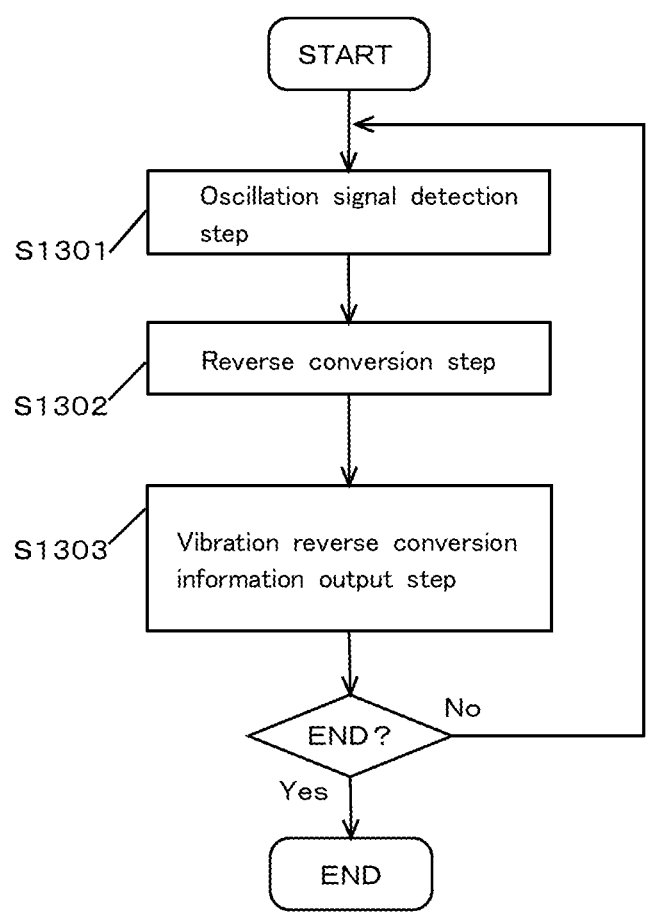
FIG. 13 is a diagram showing one example of a flow of processing in the reverse electronic converter according to Embodiment 5.

FIG. 13 is a diagram showing one example of a flow of processing in the reverse electronic converter according to the present embodiment. The flow of processing in the figure includes the following steps. First, in a step S1301, vibration generated in an electronic converter is detected as an oscillation signal (oscillation signal detection step). Then, in a step S1302, the oscillation signal detected in the oscillation signal detection step is converted into transaction information according to a reverse conversion rule (reverse conversion step). Then, in a step S1303, the transaction information reversely converted in the reverse conversion step is output (vibration reverse conversion information output step).

Effect

Occurrence of an event such as information leak or information disclosure to a malicious third party can be easily prevented by utilizing the reverse electronic converter having the configuration described above.

Embodiment 6

Outline

A reverse electronic converter according to the present embodiment is basically similar to the reverse electronic converter according to Embodiment 5, but has features of reading the code displayed by the reverse electronic converter mainly described in Embodiment 3 or the like, and reversely converting the read code into transaction information to output the information. The configuration according to which both means of oscillation detection and code reading can be used is adopted. Thus, information with higher accuracy and higher confidentiality can be transmitted and received.

Functional Configuration

Figure 14:
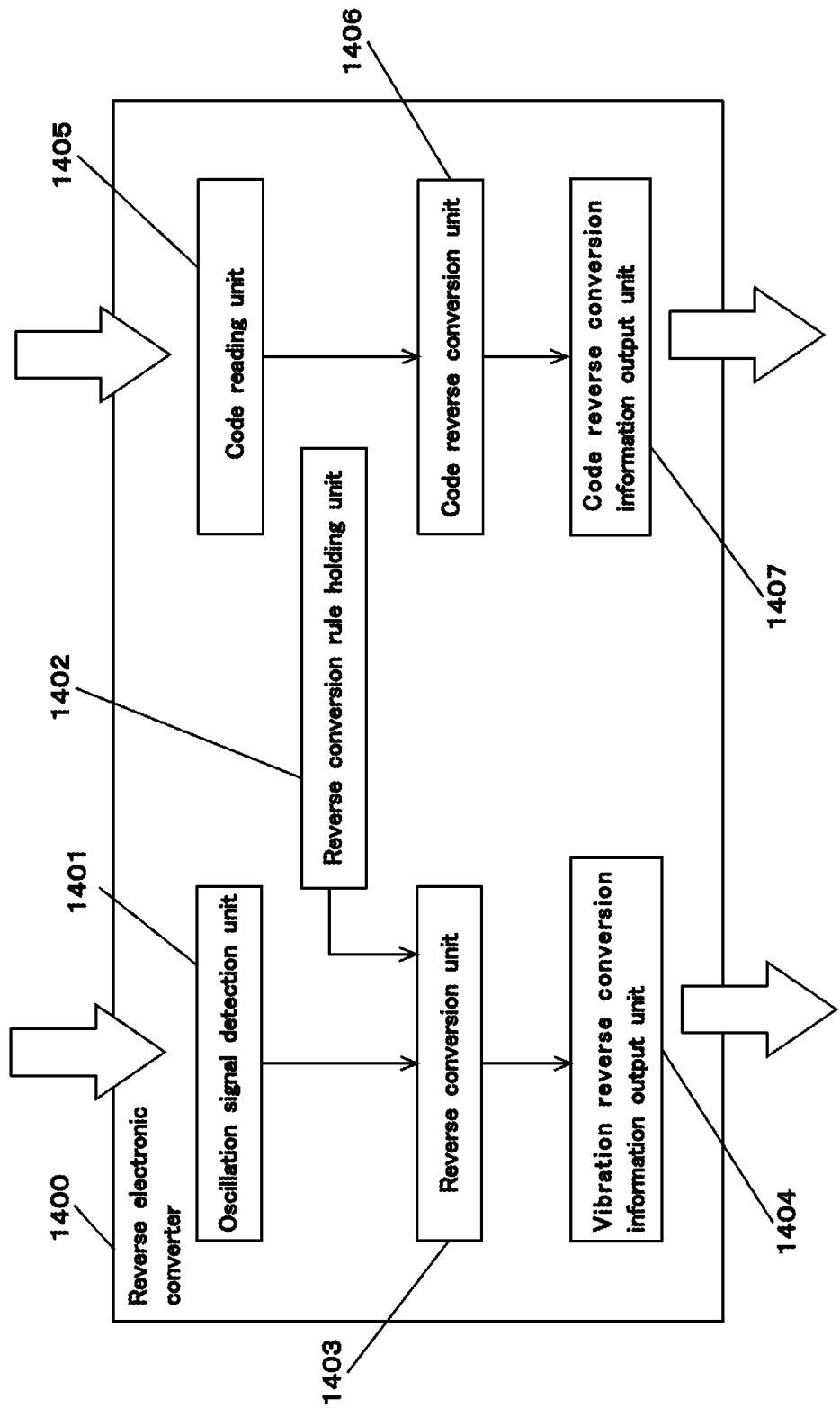
FIG. 14 is a diagram showing one example of a functional block of the reverse electronic converter according to Embodiment 6.

FIG. 14 is a diagram showing one example of a functional block of the reverse electronic converter according to the present embodiment. As shown in the figure, a "reverse transformation electronic device" 1400 according to the present invention has an "oscillation signal detection unit" 1401, a "reverse conversion rule holding unit" 1402, a "reverse conversion unit" 1403, a "vibration reverse conversion information output unit" 1404, a "code reading unit" 1405, a "code reverse conversion unit" 1406 and a "code reverse conversion information output unit" 1407. A basic configuration is common with the reverse electronic converter described using FIG. 11 in Embodiment 5, and therefore a function of the "code reading unit" 1405, the "code reverse conversion unit" 1406 and the "code reverse conversion information output unit" 1407 each being a deference will be described below.

The "code reading unit" 1405 is configured so as to read a code displayed by the electronic converter. Specifically, the "code reading unit" 1405 reads a barcode, a two-dimensional code or the like being code information to be realized by a code reader, displayed on a display or the like of the electronic converter.

The "code reverse conversion unit" 1406 is configured so as to reversely convert the code read by the code reading unit into transaction information. Specifically, such a configuration is conceivable in which a reverse conversion rule being a rule for reversely converting the code into the transaction information is held to reversely convert the code into the transaction information based on the rule. In the above case, such a configuration is preferable in which the code reverse conversion rule is received from the electronic converter. If such a configuration is adopted, upon reading the code, the transaction information associated with the code can be recognized without performing communication with an external device such as an electronic converter.

The "code reverse conversion information output unit" 1407 is configured so as to output the transaction information reversely converted in the code reverse conversion unit. A specific output destination is conceivably similar to the output destination of the vibration reverse conversion information output unit in Embodiment 5.

In addition, outputting of the transaction information in the code reverse conversion information output unit in the above case is preferably performed after outputting of the transaction information in the vibration reverse conversion information output unit is ended, and predetermined processing is ended in an output destination. The predetermined processing herein conceivably includes judgement processing whether or not the information is fair transaction information. In the above case, the information may be output from the vibration reverse conversion information output unit after the information is output from the code reverse conversion information output unit. If such a configuration is adopted, judgement of fairness of the transaction information can be performed in two steps, and transaction with higher accuracy or higher confidentiality can be performed.

In addition, such a case where at least any one of reading errors occurs for any reason is conceivable in a case where the code reading unit cannot normally read the code, in a case where the code reverse conversion unit cannot normally reversely convert the code read in the code reading unit, and in a case where the transaction information reversely converted in the code reverse conversion unit cannot be normally output. Then, such a configuration may be adopted in which the code reading unit is equipped with a reading error detection unit for judging whether or not the reading error occurs, and further provided with a vibration promotion information output unit for outputting vibration promotion transaction information being information for promoting generation of the vibration, when the reading error detection unit judges that the reading error occurs.

On the above occasion, the information output from the vibration promotion information output unit is received in the electronic converter, and in the electronic converter in which the transaction information is received, the transaction information associated with the code is converted into a vibration generation signal in the conversion unit, and the resultant signal is output as the vibration based on the vibration generation signal. Even if a defect occurs in the information display unit of the electronic converter, the code reading unit of the reverse electronic converter or the like, the information can be transmitted and received using a substitutable function by adopting such a configuration.

Specific Configuration

A hardware configuration of the reverse electronic converter according to the present invention is basically similar to the reverse electronic converter described using FIG. 12 in Embodiment 5. Then, specific processing in the "code reading unit," the "code reverse conversion unit" and the "code reverse conversion information output unit" that has not been described so far will be described below.

Specific Processing in the Code Reading Unit

The CPU reads a "code reading program" from the storage device to the main memory to execute the program to perform processing for reading a code displayed by an electronic converter.

Specific Processing in the Code Reverse Conversion Unit

The CPU reads a "code reverse conversion program" from the storage device to the main memory to execute the program to perform processing of reversely converting a code obtained by executing a code reading program into information.

Specific Processing in the Code Reverse Conversion Information Output Unit

The CPU reads a "code reverse conversion information output program" from the storage device to the main memory to execute the program to output transaction information acquired by executing the code reverse conversion program.

In addition, the CPU reads a "reading error detection program" from the storage device to the main memory to execute the program, and can perform processing of judging whether or not at least any one of the code reading program, the code conversion program and the code reverse conversion program cannot be normally executed, and the reading error occurs, and in the above case, the processing results are housed in a predetermined address of the main memory. Then, when the execution results of the program has a content to the effect that the reading error occurs, the CPU executes the "vibration promotion information output program" read from the storage device to the main memory to output the vibration promotion transaction information being the information for promoting the generation of the vibration to the electronic converter.

Flow of Processing

Figure 15:
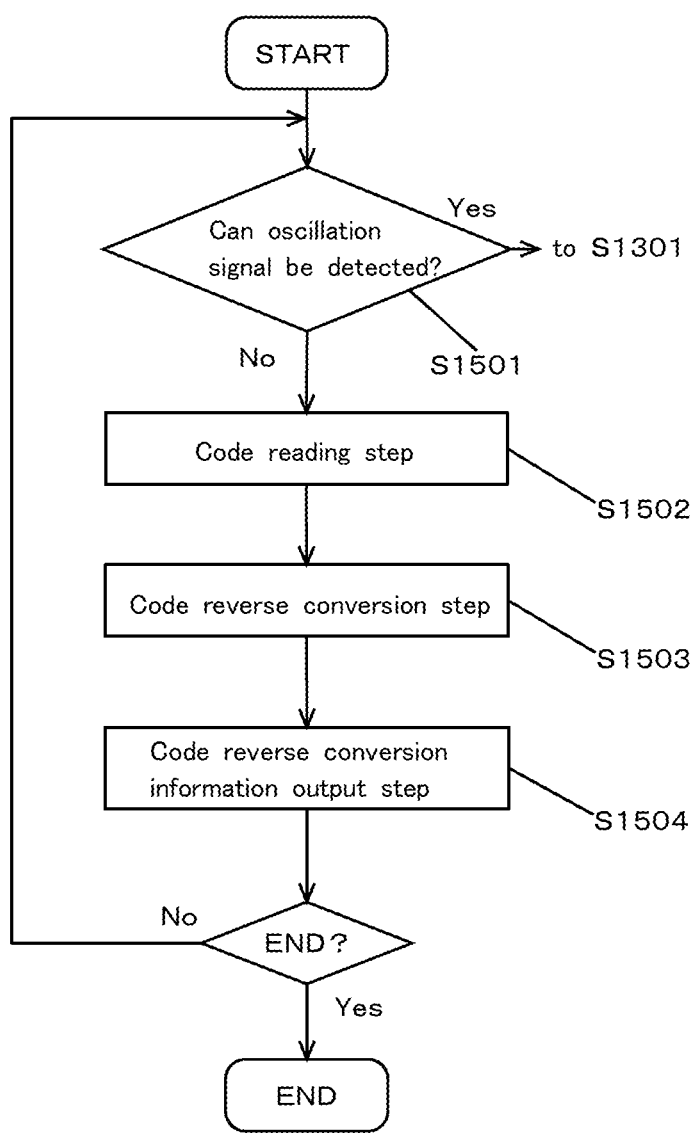
FIG. 15 is a diagram showing one example of a flow of processing in the reverse electronic converter according to Embodiment 6.

FIG. 15 is a diagram showing one example of a flow of processing in the reverse electronic converter according to the present embodiment. The flow of processing in the figure includes the following steps. First, in a step S1501, whether or not an oscillation signal can be detected is judged. In the case of the judgement results to the effect that the signal can be detected, the flow proceeds to processing in and after a step S1301. In the case of the judgement result to the effect that the signal cannot be detected, the flow proceeds to processing in and after a step S1502. In the step S1502, processing for reading a code generated by an electronic converter is performed (code reading step). Then, in a step S1503, the code read in the code reading step is reversely converted (code reverse conversion step), and in a step S1504, transaction information reversely converted in the code reverse conversion step is output (code reverse conversion information output step).

Another Flow of Processing

Figure 16:
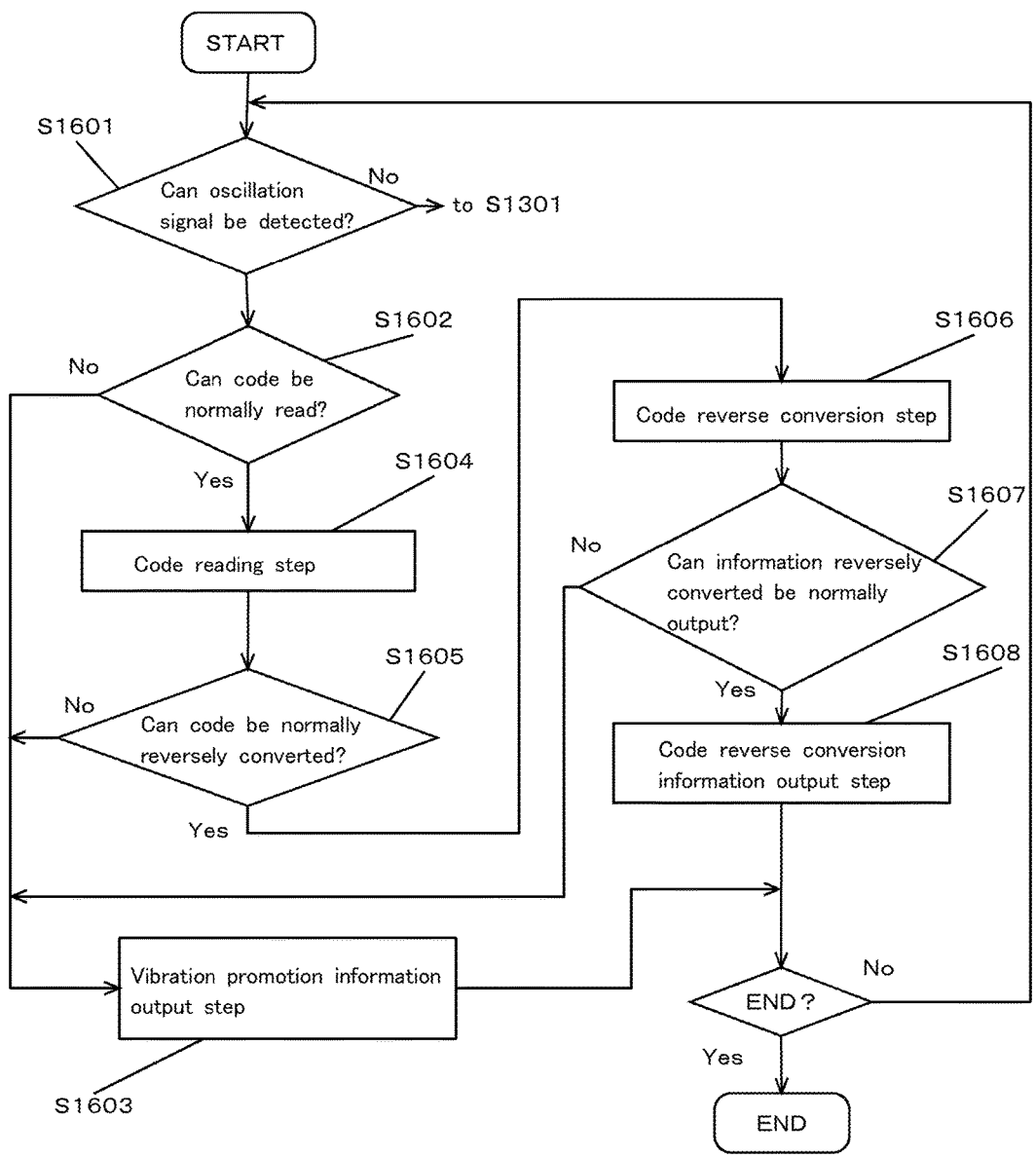
FIG. 16 is a view showing another example of a flow of processing in the reverse electronic converter according to Embodiment 6.

FIG. 16 is a diagram showing another example of a flow of processing in the reverse electronic converter according to the present embodiment. The flow of processing in the figure includes the following steps. First, in a step S1601, whether or not an oscillation signal can be detected is judged. In the case of the judgement results to the effect that the signal can be detected, the flow proceeds to processing in and after a step S1301. In the case of the judgment results to the effect that the signal cannot be detected herein, the flow proceeds to processing in and after a step S1602. In the step S1602, whether or not a code generated by an electronic converter can be accurately read is judged (reading error detection step). In the case of the judgement results to the effect that the code can be read herein, in a step S1604, processing for reading the code is performed (code reading step). In the case of the judgement results to the effect that the code cannot be read, the flow proceeds to processing in a step S1603. In the step S1603, transaction information for promoting generation of vibration is output (vibration promotion information output step).

If the processing in the step S1604 is performed, next, in a step S1605, whether or not the code read in the code reading step can be normally reversely converted is judged (reading error detection step). In the case of the judgement results to the effect that the code can be reversely converted, in a step S1606, the read code is reversely converted (code reverse conversion step). In the case of the judgement results to the effect that the code cannot be reversely converted, the flow proceeds to processing in the step S1603.

Then, if the processing in the step S1606 is performed, next, in a step S1607, whether or not the transaction information reversely converted in the code reverse conversion step can be normally output is judged (reading error detection step). In the case of the judgement results to the effect that the transaction information can be output herein, in a step S1608, the transaction information reversely converted is output (code reverse information output step). In the case of the judgement results to the effect that the transaction information cannot be output, the flow proceeds to the step S1603.

Effect

In comparison with the reverse electronic converter according to Embodiment 5, information with higher accuracy and higher confidentiality can be transmitted and received by adopting the configuration described above in which both means of vibration detection and code reading can be used.

Embodiment 7

Outline

A reverse electronic converter according to the present embodiment is basically similar to the reverse electronic converter according to Embodiment 5 or 6, but has features of judging whether or not any one of detection errors occurs in a case where an oscillation signal detection unit cannot normally detect an oscillation signal, in a case where a reverse conversion unit cannot normally reversely convert the oscillation signal detected by the oscillation signal detection unit, and in a case where the transaction information reversely converted in the reverse conversion unit cannot be normally output, and if the detection error is judged to occur, outputting transaction information for promoting display of the code. Even if vibration detection should work negatively, a means for promoting processing for code reading as a substitute means to further securely transmit and receive the information can be obtained by adopting such a configuration.

Functional Configuration

Figure 17:
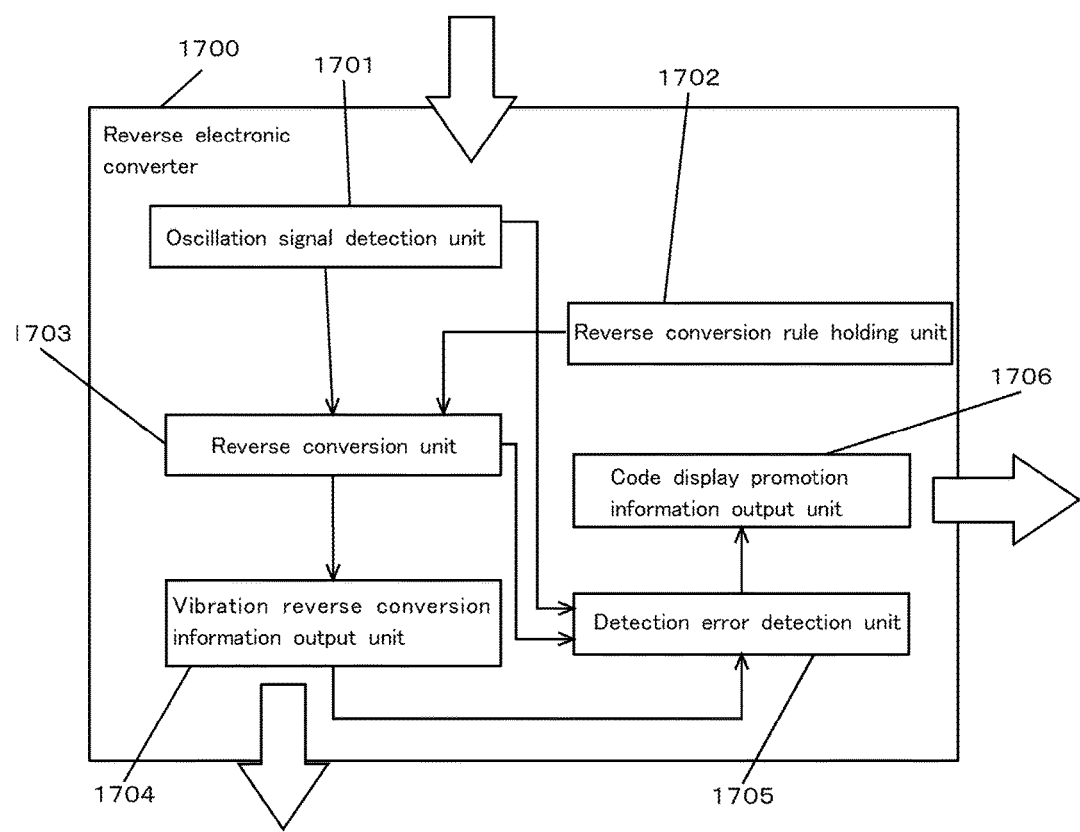
FIG. 17 is a diagram showing one example of a functional block of the reverse electronic converter according to Embodiment 7.

FIG. 17 is a diagram showing one example of a functional block of the reverse electronic converter according to the present embodiment. As shown in the figure, a "reverse electronic converter" 1700 according to the present embodiment has an "oscillation signal detection unit" 1701, a "reverse conversion rule holding unit" 1702, a "reverse conversion unit" 1703, a "vibration reverse conversion information output unit" 1704, a "detection error detection unit" 1705 and a "code display promotion information output unit" 1706. A basic configuration is common with the reverse electronic converter described using FIG. 11 in Embodiment 5 and the reverse electronic converter described in Embodiment 6, and therefore a function of the "detection error detection unit" 1705 and the "code display promotion information output unit" 1706 each being a deference will be described below.

The "detection error detection unit" 1705 is configured so as to judge whether or not any one of detection errors occurs in a case where an oscillation signal detection unit cannot normally detect an oscillation signal, in a case where a reverse conversion unit cannot normally reversely convert the oscillation signal detected by the oscillation signal detection unit, and in a case where the transaction information reversely converted in the reverse conversion unit cannot be normally output. All of the cases "where the signal cannot be normally detected," "where the signal cannot be normally reversely converted" and "where the information cannot be normally output" mean that a case of presence of abnormality such as a defect or a failure of each function is considered.

The "code display promotion information output unit" 1706 is configured so as to output code display promotion transaction information being the information for promoting display of the code when the detection error unit judges that the detection error occurs.

Specific Configuration

A hardware configuration of the reverse electronic converter according to the present embodiment is basically similar to the reverse electronic converter described using FIG. 12 in Embodiment 5. Then, specific processing in the "detection error detection unit" and the "code display promotion information output unit" that has not been described so far will be described below.

Specific Processing in the Detection Error Detection Unit

The CPU reads a "detection error detection program" from the storage device to the main memory to execute the program to perform processing of judging whether or not at least any one of an oscillation signal detection program, a reverse conversion program and a vibration reverse conversion information output program cannot be normally executed, resulting in occurrence of the detection error.

Specific Processing in the Code Display Promotion Information Output Unit

In the case of obtaining the judgement results to the effect that the detection error occurs by executing the detection error detection program, the CPU executes the "code display promotion information output program" read from the storage device to the main memory to output the transaction information for promoting display of the code to the electronic converter.

Flow of Processing

FIG. 18 is a diagram showing one example of a flow of processing in the reverse electronic converter according to the present embodiment. The flow of processing in the figure includes the following steps. First, in a step S1801, whether or not vibration generated in the electronic converter can be normally detected as an oscillation signal is judged (detection error detection step). In the case of the judgement results to the effect that the vibration can be detected herein, in a step S1803, the vibration is detected as the oscillation signal (oscillation signal detection step). In the case of the judgement results to the effect that the vibration cannot be detected, in a step S1802, transaction information for promoting display of a code is output to an electronic converter (code display promotion information output step).

If the processing in the step S1803 is performed, in a step S1804, whether or not the oscillation signal detected in the oscillation signal detection step can be reversely converted into information according to a reverse conversion rule is judged (detection error detection step), and in the case of the judgement results to the effect that the oscillation signal can be reversely converted, in a step S1805, the oscillation signal is reversely converted (reverse conversion step). In the case of the judgement results to the effect that the oscillation signal cannot be reversely converted, the flow proceeds to processing in the step S1802.

If the processing in the step S1805 is performed, in a step S1806, whether or not the transaction information reversely converted in the reverse conversion step can be normally output is judged (detection error detection step). In the case of the judgement results to the effect that the transaction information can be output herein, in a step S1807, the transaction information reversely converted is output (vibration reverse conversion information output step). In the case of the judgement results to the effect that the transaction information cannot be output, the flow proceeds to the step S1802.

Effect

Even if vibration detection should work negatively, a means for promoting processing for code reading as a substitute means to further securely transmit and receive the information can be obtained by adopting such a configuration.

The invention claimed is:

1. An electronic converter, comprising:
   an information receiver that is configured to receive transaction information from outside through a network;
   a memory that is configured to store a conversion rule, the conversion rule being configured to convert the transaction information into a vibration generation signal, the memory being configured to store a reverse conversion rule, the memory being configured to store computer-readable instructions;
   a vibration generator that is configured to receive the vibration generation signal so as to generate vibration corresponding to the transaction information;
   a vibration detector that is configured to detect the vibration so as to generate a vibration detection signal corresponding to the transaction information, the reverse conversion rule being configured to reversely convert the vibration detection signal into the transaction information;
   an error detector that is configured to detect a detection error in the vibration detector, a reverse-conversion error in a processor in which the vibration detection signal is reversely converted into the transaction information, and an output error in the processor in which the transaction information, which is reversely converted from the vibration detection signal, is output; and
   the processor that is configured to execute the computer-readable instructions so as to:
      convert the transaction information into the vibration generation signal according to the conversion rule;
      cause the vibration generator to generate the vibration corresponding to the vibration generation signal;
      cause the vibration detector to detect the vibration so as to generate the vibration detection signal corresponding to the vibration;
      reverse-convert the vibration detection signal into the transaction information according to the reverse conversion rule;
      output the transaction information that is reversely converted from the vibration detection signal; and
      output code display promotion transaction information when the processor detects at least one of the detection error, the reverse-conversion error, or the output error, and the code display promotion transaction information being configured by a code corresponding to the transaction information.

2. The electronic converter according to claim 1, further comprising:
   an accompanying information generator that is configured to generate at least any one accompanying information of a sonic wave, an ultrasonic wave, a still image, or a moving image,
   wherein the processor is configured to cause the vibration generator and the accompanying information generator to generate the vibration and the accompanying information at the same time.

3. The electronic converter according to claim 1, further comprising:
   an information display that is configured to display the transaction information received from outside through the network.

4. The electronic converter according to claim 3,
   wherein the processor is configured to convert the transaction information received from outside through the network into the code, and
   the processor is configured to cause the information display to display the code.

5. The electronic converter according to claim 1,
   wherein the memory is configured to store a redundancy conversion rule, and the redundancy conversion rule is configured to convert the transaction information received from outside through the network into a plurality of different kind vibration generation signals,
   the processor is configured to convert the transaction information into the plurality of different kind vibration generation signals according to the redundancy conversion rule, and
   the processor is configured to cause the vibration generator to generate at least one of the vibration, an ultrasonic wave, or a sonic wave corresponding to the plurality of different kind vibration generation signals.

6. The electronic converter according to claim 4, further comprising:
   a code reader that is configured to read the code displayed in the information display,
   wherein the processor is further configured to:
      reverse-convert the code into the transaction information; and
      output the transaction information that is reversely converted from the code.

7. The electronic converter according to claim 6,
   wherein the error detector is further configured to detect a reading error in the code reader, a code reverse-conversion error in the processor in which the code is reversely converted into the transaction information, and a code output error in the processor in which the transaction information, which is reversely converted from to the code, is output, and
   the processor is configured to output vibration generation promotion transaction information when the processor detects at least one of the reading error, the code reverse-conversion error, or the code output error, and the vibration generation promotion transaction information being configured by the code corresponding to the transaction information.

8. An electronic converter, comprising:
an information receiver that is configured to receive transaction information from outside through a network;
a memory that is configured to store an ultrasonic wave conversion rule, the ultrasonic wave conversion rule being configured to convert the transaction information into an ultrasonic wave generation signal, the memory being configured to store an ultrasonic wave reverse conversion rule, the memory being configured to store computer-readable instructions;
an ultrasonic wave generator that is configured to receive the ultrasonic wave generation signal so as to generate an ultrasonic wave corresponding to the transaction information;
an ultrasonic wave detector that is configured to detect the ultrasonic wave so as to generate an ultrasonic wave detection signal corresponding to the transaction information, the ultrasonic wave reverse conversion rule being configured to reversely convert the ultrasonic wave detection signal into the transaction information;
an error detector that is configured to detect a detection error in the ultrasonic wave detector, a reverse-conversion error in a processor in which the ultrasonic wave detection signal is reversely converted into the transaction information, and an output error in the processor in which the transaction information, which is reversely converted from the ultrasonic wave detection signal, is output; and
the processor that is configured to execute the computer-readable instructions so as to:
convert the transaction information into the ultrasonic wave generation signal according to the ultrasonic wave conversion rule;
cause the ultrasonic wave generator to generate the ultrasonic wave corresponding to the ultrasonic wave generation signal;
cause the ultrasonic wave detector to detect the ultrasonic wave so as to generate the ultrasonic wave detection signal corresponding to the ultrasonic wave;
reverse-convert the ultrasonic wave detection signal into the transaction information according to the ultrasonic wave reverse conversion rule;
output the transaction information that is reversely converted from the ultrasonic wave detection signal; and
output code display promotion transaction information when the processor detects at least one of the detection error, the reverse-conversion error, or the output error, and the code display promotion transaction information being configured by a code corresponding to the transaction information.

9. The electronic converter according to claim 8, further comprising:
an ultrasonic wave accompanying information generator that is configured to generate at least any one ultrasonic wave accompanying information of a sonic wave, another ultrasonic wave, a still image, or a moving image,
wherein the processor is configured to cause the ultrasonic wave generator and the ultrasonic wave accompanying information generator to generate the ultrasonic wave and the ultrasonic wave accompanying information at the same time.

10. The electronic converter according to claim 8, further comprising:
an information display that is configured to display the transaction information received from outside through the network.

11. The electronic converter according to claim 8,
wherein the memory is configured to store a redundancy conversion rule, and the redundancy conversion rule is configured to convert the transaction information received from outside through the network into a plurality of different kind ultrasonic wave generation signals,
the processor is configured to convert the transaction information into the plurality of different kind ultrasonic wave generation signals according to the redundancy conversion rule, and
the processor is configured to cause the ultrasonic wave generator to generate at least one of vibration, the ultrasonic wave, or a sonic wave corresponding to the plurality of different kind ultrasonic wave generation signals.

12. The electronic converter according to claim 10,
wherein the processor is configured to convert the transaction information received from outside through the network into the code, and
the processor is configured to cause the information display to display the code.

13. The electronic converter according to claim 12, further comprising:
a code reader that is configured to read the code displayed in the information display,
wherein the processor is further configured to:
reverse-convert the code into the transaction information; and
output the transaction information that is reversely converted from the code.

14. The electronic converter according to claim 13,
wherein the error detector is further configured to detect a reading error in the code reader, a code reverse-conversion error in the processor in which the code is reversely converted into the transaction information, and a code output error in the processor in which the transaction information, which is reversely converted from the code, is output, and
the processor is configured to output ultrasonic wave generation promotion transaction information when the processor detects at least one of the reading error, the code reverse-conversion error, or the code output error, and the ultrasonic wave generation promotion transaction information being configured by the code corresponding to the transaction information.

15. A computer program product for an electronic converter embodying computer-readable instructions, a conversion rule, and a reverse conversion rule stored on a non-transitory computer-readable medium for causing a computer to execute the computer-readable instructions by a processor so as to perform the steps of:
receiving transaction information from outside through a network;
converting the transaction information into a vibration generation signal according to the conversion rule;
receiving the vibration generation signal so as to generate vibration corresponding to the transaction information;
first detecting the vibration so as to generate a vibration detection signal corresponding to the transaction information;
reverse-converting the vibration detection signal into the transaction information according to the reverse conversion rule;

first outputting the transaction information that is reversely converted from the vibration detection signal;
second detecting a detection error in the first detecting, a reverse-conversion error in the reverse-converting, and an output error in the first outputting; and
second outputting code display promotion transaction information when the processor detects at least one of the detection error, the reverse-conversion error, or the output error, and the code display promotion transaction information being configured by a code corresponding to the transaction information.

16. The computer program product according to claim 15, further comprising the steps of:
generating at least any one accompanying information of a sonic wave, an ultrasonic wave, a still image, or a moving image,
wherein the vibration and the accompanying information are generated at the same time.

17. The computer program product according to claim 15, further comprising the steps of:
displaying the transaction information received from outside through the network in an information display.

18. The computer program product according to claim 17, further comprising the steps of:
converting the transaction information received from outside through the network into the code that is configured to be displayed in the information display.

19. The computer program product according to claim 15, wherein the non-transitory computer-readable medium is configured to store a redundancy conversion rule,
the processor is configured to convert the transaction information received from outside through the network into a plurality of different kind vibration generation signals according to the redundancy conversion rule, and
the processor is configured to generate at least one of the vibration, an ultrasonic wave, or a sonic wave corresponding to the plurality of different kind vibration generation signals.

20. The computer program product according to claim 18, further comprising the steps of:
reading the code that is configured to be displayed in the information display;
reverse-converting the code into the transaction information; and
third outputting the transaction information that is reversely converted from the code.

21. The program for the reverse electronic converter according to claim 20, further comprising the steps of:
detecting a reading error in the reading, a code reverse-conversion error in the reverse-converting of the code, and a code output error in the third outputting; and
fourth outputting vibration generation promotion transaction information when at least one of the reading error, the code reverse-conversion error, or the code output error is detected, and the vibration generation promotion transaction information being configured by the code corresponding to the transaction information.

22. A computer program product for an electronic converter embodying computer-readable instructions, an ultrasonic wave conversion rule, and an ultrasonic wave reverse conversion rule stored on a non-transitory computer-readable medium for causing a computer to execute the computer-readable instructions by a processor so as to perform the steps of:
receiving transaction information from outside through a network;
converting the transaction information into an ultrasonic wave generation signal according to the ultrasonic wave conversion rule;
receiving the ultrasonic wave generation signal so as to generate an ultrasonic wave corresponding to the transaction information;
first detecting the ultrasonic wave so as to generate an ultrasonic wave detection signal corresponding to the transaction information;
reverse-converting the ultrasonic wave detection signal into the transaction information according to the ultrasonic wave reverse conversion rule;
first outputting the transaction information that is reversely converted from the ultrasonic wave detection signal;
second detecting a detection error in the first detecting, a reverse-conversion error in the reverse-converting, and an output error in the first outputting; and
second outputting code display promotion transaction information when the processor detects at least one of the detection error, the reverse-conversion error, or the output error, and the code display promotion transaction information being configured by a code corresponding to the transaction information.

23. An electronic converter comprising:
an information receiver that is configured to receive transaction code information from outside through a network;
an information display that is configured to display the transaction code information received from outside through the network;
a memory that is configured to store a conversion rule, the conversion rule being configured to convert the transaction code information into a vibration generation signal, the memory being configured to store computer-readable instructions;
a vibration generator that is configured to receive the vibration generation signal so as to generate vibration corresponding to the transaction code information;
an accompanying information generator that is configured to generate at least any one accompanying information of a sonic wave, an ultrasonic wave, a still image, or a moving image; and
a processor that is configured to execute the computer-readable instructions so as to:
convert the transaction code information into the vibration generation signal according to the conversion rule;
cause the vibration generator to generate the vibration corresponding to the vibration generation signal; and
determine whether the transaction code information is a fair transaction according to the vibration and the accompanying information,
wherein the accompanying information has no direct relationship with the transaction code information,
the processor is configured to cause the vibration generator and the accompanying information generator to generate the vibration and the accompanying information at the same time, and
the processor is configured to cause the information display to display contents of the transaction code information corresponding to the vibration.

24. The electronic converter according to claim 23, wherein the memory is configured to store a redundancy conversion rule, and the redundancy conversion rule is configured to convert the transaction code information received from outside through the network into a plurality of different kind vibration generation signals, the processor is configured to convert the transaction code information into the plurality of different kind vibration generation signals according to the redundancy conversion rule, and the processor is configured to cause the vibration generator to generate at least one of the vibration, an ultrasonic wave, or a sonic wave corresponding to the plurality of different kind vibration generation signals.

25. An electronic converter comprising:

an information receiver that is configured to receive transaction code information from outside through a network;

an information display that is configured to display the transaction code information received from outside through the network;

a memory that is configured to store an ultrasonic wave conversion rule, the ultrasonic wave conversion rule being configured to convert the transaction code information into an ultrasonic wave generation signal, the memory being configured to store computer-readable instructions;

an ultrasonic wave generator that is configured to receive the ultrasonic wave generation signal so as to generate an ultrasonic wave corresponding to the transaction code information;

an accompanying information generator that is configured to generate at least any one accompanying information of a sonic wave, another ultrasonic wave, a still image, or a moving image; and a processor that is configured to execute the computer-readable instructions so as to:

convert the transaction code information into the ultrasonic wave generation signal according to the ultrasonic wave conversion rule;

cause the ultrasonic wave generator to generate the ultrasonic wave corresponding to the ultrasonic wave generation signal; and determine whether the transaction code information is a fair transaction according to the ultrasonic wave and the accompanying information, wherein the accompanying information has no direct relationship with the transaction code information, the processor is configured to cause the ultrasonic wave generator and the accompanying information generator to generate the ultrasonic wave and the accompanying information at the same time, and the processor is configured to cause the information display to display contents of the transaction code information corresponding to the ultrasonic wave.

26. The electronic converter according to claim 25, wherein the memory is configured to store a redundancy conversion rule, and the redundancy conversion rule being configured to convert the transaction code information received from outside through the network into a plurality of different kind ultrasonic wave generation signals, the processor is configured to convert the transaction code information into the plurality of different kind ultrasonic wave generation signals according to the redundancy conversion rule, and the processor is configured to cause the ultrasonic wave generator to generate at least one of vibration, the ultrasonic wave, or a sonic wave corresponding to the plurality of different kind ultrasonic wave generation signals.

27. A computer program product for an electronic converter embodying computer-readable instructions and a conversion rule stored on a non-transitory computer-readable medium for causing a computer to execute the computer-readable instructions by a processor so as to perform the steps of:

receiving transaction code information from outside through a network;

converting the transaction code information into a vibration generation signal according to the conversion rule;

receiving the vibration generation signal so as to generate vibration corresponding to the transaction code information;

generating at least any one accompanying information of a sonic wave, an ultrasonic wave, a still image, or a moving image; and determine whether the transaction code information is a fair transaction according to the vibration and the accompanying information, wherein the accompanying information has no direct relationship with the transaction code information, the processor is configured to generate the vibration and the accompanying information at the same time, and the processor is configured to display contents of the transaction code information corresponding to the vibration in an information display.

28. The computer program product according to claim 27, wherein the non-transitory computer-readable medium is configured to store a redundancy conversion rule, the processor is configured to convert the transaction code information received from outside through the network into a plurality of different kind vibration generation signals according to the redundancy conversion rule, and the processor is configured to generate at least one of the vibration, an ultrasonic wave, or a sonic wave corresponding to the plurality of different kind vibration generation signals.

29. A computer program product for an electronic converter embodying computer-readable instructions and a conversion rule stored on a non-transitory computer-readable medium for causing a computer to execute the computer-readable instructions by a processor so as to perform the steps of:

receiving transaction code information from outside through a network;

converting the transaction code information into an ultrasonic wave generation signal according to the conversion rule;

receiving the ultrasonic wave generation signal so as to generate an ultrasonic wave corresponding to the transaction code information;

generating at least any one accompanying information of a sonic wave, another ultrasonic wave, a still image, or a moving image; and determine whether the transaction code information is a fair transaction according to the ultrasonic wave and the accompanying information, wherein the accompanying information has no direct relationship with the transaction code information, the processor is configured to generate the ultrasonic wave and the accompanying information at the same time, and the processor is configured to display contents of the transaction code information corresponding to the ultrasonic wave in an information display.

30. The computer program product according to claim 29,
wherein the non-transitory computer-readable medium is configured to store a redundancy conversion rule,
the processor is configured to convert the transaction code information received from outside through the network into a plurality of different kind ultrasonic wave generation signals according to the redundancy conversion rule, and
the processor is configured to generate at least one of vibration, another ultrasonic wave, or a sonic wave corresponding to the plurality of different kind ultrasonic wave generation signals.

31. An electronic converter, comprising:
an information receiver that is configured to receive transaction information from outside through a network;
an information display that is configured to display the transaction information and a code corresponding to the transaction information;
a memory that is configured to store a conversion rule, the conversion rule being configured to convert the transaction information into a vibration generation signal, the memory being configured to store a reverse conversion rule, the memory being configured to store computer-readable instructions;
a vibration generator that is configured to receive the vibration generation signal so as to generate vibration corresponding to the transaction information;
a vibration detector that is configured to detect the vibration so as to generate a vibration detection signal corresponding to the transaction information, the reverse conversion rule being configured to reversely convert the vibration detection signal into the transaction information;
a code reader that is configured to read the code displayed on the information display;
an error detector that is configured to detect a reading error in the code reader, a reverse-conversion error in a processor in which the code is reversely converted into the transaction information, and an output error in the processor in which the transaction information, which is reversely converted from the code, is output; and
the processor that is configured to execute the computer-readable instructions so as to:
  convert the transaction information into the vibration generation signal according to the conversion rule;
  cause the code reader to read the code displayed in the information display;
  cause the vibration generator to generate the vibration corresponding to the vibration generation signal;
  cause the vibration detector to detect the vibration so as to generate the vibration detection signal corresponding to the vibration;
  reverse-convert the vibration detection signal into the transaction information according to the reverse conversion rule;
  reverse-convert the code into the transaction information;
  output the transaction information that is reversely converted from the vibration detection signal and output the transaction information that is reversely converted from the code; and
  output vibration generation promotion transaction information when the processor detects at least one of the reading error, the reverse-conversion error, or the output error,
wherein the processor is configured to cause the vibration generator to generate the vibration corresponding to the transaction information according to the vibration generation promotion transaction information.

32. The electronic converter according to claim 31, further comprising:
an accompanying information generator that is configured to generate at least any one accompanying information of a sonic wave, an ultrasonic wave, a still image, or a moving image,
wherein the processor is configured to cause the vibration generator and the accompanying information generator to generate the vibration and the accompanying information at the same time.

33. The electronic converter according to claim 31,
wherein the memory is configured to store a redundancy conversion rule, and the redundancy conversion rule being configured to convert the transaction information received from outside through the network into a plurality of different kind vibration generation signals,
the processor is configured to convert the transaction information into the plurality of different kind vibration generation signals according to the redundancy conversion rule, and
the processor is configured to cause the vibration generator to generate at least one of the vibration, an ultrasonic wave, or a sonic wave corresponding to the plurality of different kind vibration generation signals.

34. An electronic converter, comprising:
an information receiver that is configured to receive transaction information from outside through a network;
an information display that is configured to display the transaction information and a code corresponding to the transaction information;
a memory that is configured to store an ultrasonic wave conversion rule, the ultrasonic wave conversion rule being configured to convert the transaction information into an ultrasonic wave generation signal, the memory being configured to store an ultrasonic wave reverse conversion rule, the memory being configured to store computer-readable instructions;
an ultrasonic wave generator that is configured to receive the ultrasonic wave generation signal so as to generate an ultrasonic wave corresponding to the transaction information;
an ultrasonic wave detector that is configured to detect the ultrasonic wave so as to generate an ultrasonic wave detection signal corresponding to the transaction information, the ultrasonic wave reverse conversion rule being configured to reversely convert the ultrasonic wave detection signal into the transaction information;
a code reader that is configured to read the code displayed on the information display;
an error detector that is configured to detect a reading error in the code reader, a reverse-conversion error in the processor in which the code is reversely converted into the transaction information, and an output error in the processor in which the transaction information, which is reversely converted from the code, is output; and
a processor that is configured to execute the computer-readable instructions so as to:
  convert the transaction information into the ultrasonic wave generation signal according to the ultrasonic wave conversion rule;

cause the code reader to read the code displayed in the information display;
cause the ultrasonic wave generator to generate the ultrasonic wave corresponding to the ultrasonic wave generation signal;
cause the ultrasonic wave detector to detect the ultrasonic wave so as to generate the ultrasonic wave detection signal corresponding to the ultrasonic wave;
reverse-convert the ultrasonic wave detection signal into the transaction information according to the ultrasonic wave reverse conversion rule;
reverse-convert the code into the transaction information;
output the transaction information that is reversely converted from the ultrasonic wave detection signal and output the transaction information that is reversely converted from the code; and
output ultrasonic wave generation promotion transaction information when the processor detects at least one of the reading error, the reverse-conversion error, or the output error,
wherein the processor is configured to cause the ultrasonic wave generator to generate the ultrasonic wave corresponding to the transaction information according to the ultrasonic wave generation promotion transaction information.

35. The electronic converter according to claim 34, further comprising:
an ultrasonic wave accompanying information generator that is configured to generate at least any one ultrasonic wave accompanying information of a sonic wave, another ultrasonic wave, a still image, or a moving image,
wherein the processor is configured to cause the ultrasonic wave generator and the ultrasonic wave accompanying information generator to generate the ultrasonic wave and the ultrasonic wave accompanying information at the same time.

36. The electronic converter according to claim 34,
wherein the memory is configured to store a redundancy conversion rule, and the redundancy conversion rule is configured to convert the transaction information received from outside through the network into a plurality of different kind ultrasonic wave generation signals,
the processor is configured to convert the transaction information into the plurality of different kind ultrasonic wave generation signals according to the redundancy conversion rule, and
the processor is configured to cause the ultrasonic wave generator to generate at least one of vibration, the ultrasonic wave, or a sonic wave corresponding to the plurality of different kind ultrasonic wave generation signals.

37. A computer program product for an electronic converter embodying computer-readable instructions, a conversion rule, and a reverse conversion rule stored on a non-transitory computer-readable medium for causing a computer to execute the computer-readable instructions by a processor so as to perform the steps of:
receiving transaction information from outside through a network;
displaying the transaction information and a code corresponding to the transaction information in an information display;
converting the transaction information into a vibration generation signal according to the conversion rule;
reading the code displayed in the information display;
receiving the vibration generation signal so as to generate vibration corresponding to the transaction information;
first detecting the vibration so as to generate a vibration detection signal corresponding to the transaction information;
first reverse-converting the vibration detection signal into the transaction information according to the reverse conversion rule;
second reverse-converting the code into the transaction information;
first outputting the transaction information that is reversely converted from the vibration detection signal;
second outputting the transaction information that is reversely converted from the code;
second detecting a reading error in the reading, a reverse-conversion error in the second reverse-converting, and an output error in the second outputting; and
third outputting vibration generation promotion transaction information when the processor detects at least one of the reading error, the reverse-conversion error, or the output error,
wherein the vibration corresponding to the transaction information is generated according to the vibration generation promotion transaction information.

38. The computer program product according to claim 37, further comprising the steps of:
generating at least any one accompanying information of a sonic wave, an ultrasonic wave, a still image, or a moving image,
wherein the vibration and the accompanying information are generated at the same time.

39. The computer program product according to claim 37,
wherein the non-transitory computer-readable medium is configured to store a redundancy conversion rule,
the processor is configured to convert the transaction information received from outside through the network into a plurality of different kind vibration generation signals according to the redundancy conversion rule, and
the processor is configured to generate at least one of the vibration, an ultrasonic wave, or a sonic wave corresponding to the plurality of different kind vibration generation signals.

40. A computer program product for an electronic converter embodying computer-readable instructions, an ultrasonic wave conversion rule, and an ultrasonic wave reverse conversion rule stored on a non-transitory computer-readable medium for causing a computer to execute the computer-readable instructions by a processor so as to perform the steps of:
receiving transaction information from outside through a network;
displaying the transaction information and a code corresponding to the transaction information in an information display;
converting the transaction information into an ultrasonic wave generation signal according to the ultrasonic wave conversion rule;
reading the code displayed in the information display;
receiving the ultrasonic wave generation signal so as to generate an ultrasonic wave corresponding to the transaction information;

first detecting the ultrasonic wave so as to generate an ultrasonic wave detection signal corresponding to the transaction information;
first reverse-converting the ultrasonic wave detection signal into the transaction information according to the ultrasonic wave reverse conversion rule;
second reverse-converting the code into the transaction information;
first outputting the transaction information that is reversely converted from the ultrasonic wave detection signal;
second outputting the transaction information that is reversely converted from the code;
second detecting a reading error in the reading, a reverse-conversion error in the second reverse-converting, and an output error in the second outputting; and
third outputting ultrasonic wave generation promotion transaction information when the processor detects at least one of the reading error, the reverse-conversion error, or the output error,
wherein the ultrasonic wave corresponding to the transaction information is generated according to the ultrasonic wave generation promotion transaction information.

41. The computer program product according to claim 40, further comprising the steps of:

generating at least any one accompanying information of a sonic wave, another ultrasonic wave, a still image, or a moving image, wherein the ultrasonic wave and the accompanying information are generated at the same time.

42. The computer program product according to claim 40, wherein the non-transitory computer-readable medium is configured to store a redundancy conversion rule, the processor is configured to convert the transaction information received from outside through the network into a plurality of different kind ultrasonic wave generation signals according to the redundancy conversion rule, and the processor is configured to generate at least one of vibration, the ultrasonic wave, or a sonic wave corresponding to the plurality of different kind ultrasonic wave generation signals.

* * * * *